United States Patent [19]
Lennen

[11] Patent Number: 5,949,372
[45] Date of Patent: Sep. 7, 1999

[54] SIGNAL INJECTION FOR CALIBRATION OF PSEUDO-RANGE ERRORS IN SATELLITE POSITIONING SYSTEM RECEIVERS

[75] Inventor: Gary R. Lennen, Cupertino, Calif.

[73] Assignee: Trimble Navigation Limited, Sunnyvale, Calif.

[21] Appl. No.: 08/943,656

[22] Filed: Oct. 3, 1997

[51] Int. Cl.[6] ....................................................... G01S 5/02
[52] U.S. Cl. ...................................... 342/357.02; 701/213
[58] Field of Search ............................... 342/357, 357.02, 342/357.12; 701/213, 214

[56] References Cited

U.S. PATENT DOCUMENTS

| | | | |
|---|---|---|---|
| 4,463,357 | 7/1984 | MacDoran | 343/460 |
| 4,809,005 | 2/1989 | Counselman, III | 342/352 |
| 5,041,833 | 8/1991 | Weinberg | 342/357 |
| 5,486,834 | 1/1996 | Lennen | 342/357 |
| 5,515,057 | 5/1996 | Lennen et al. . | |
| 5,526,291 | 6/1996 | Lennen . | |
| 5,841,396 | 11/1998 | Krasner | 342/357 |

*Primary Examiner*—Mark Hellner
*Attorney, Agent, or Firm*—Boris G. Tankhilevich

[57] ABSTRACT

The present invention discloses the apparatus and the methods for calibrating a Narrow Band receiver for the group delay code phase errors. The group delay code phase errors are caused by group delay variations in the satellite signals being transmitted by a Narrow Band satellite Transmitter. A Calibration generator circuit generates a calibration signal that is substantially similar to the satellite signal but is free from the group delay variations. The calibration signal is used by the Narrow Band satellite Receiver to measure and eliminate the code phase group delay errors.

20 Claims, 16 Drawing Sheets

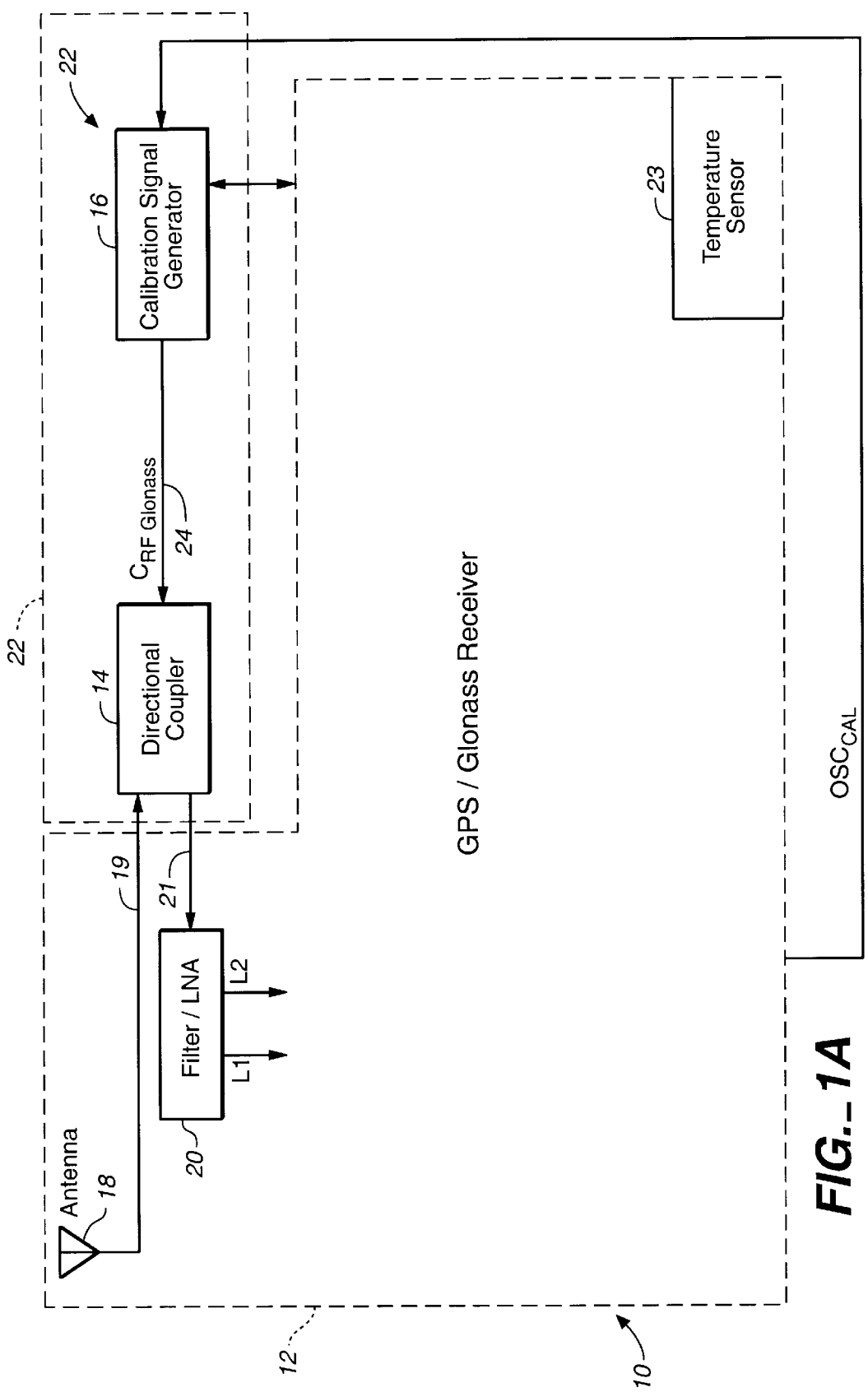
FIG._1A

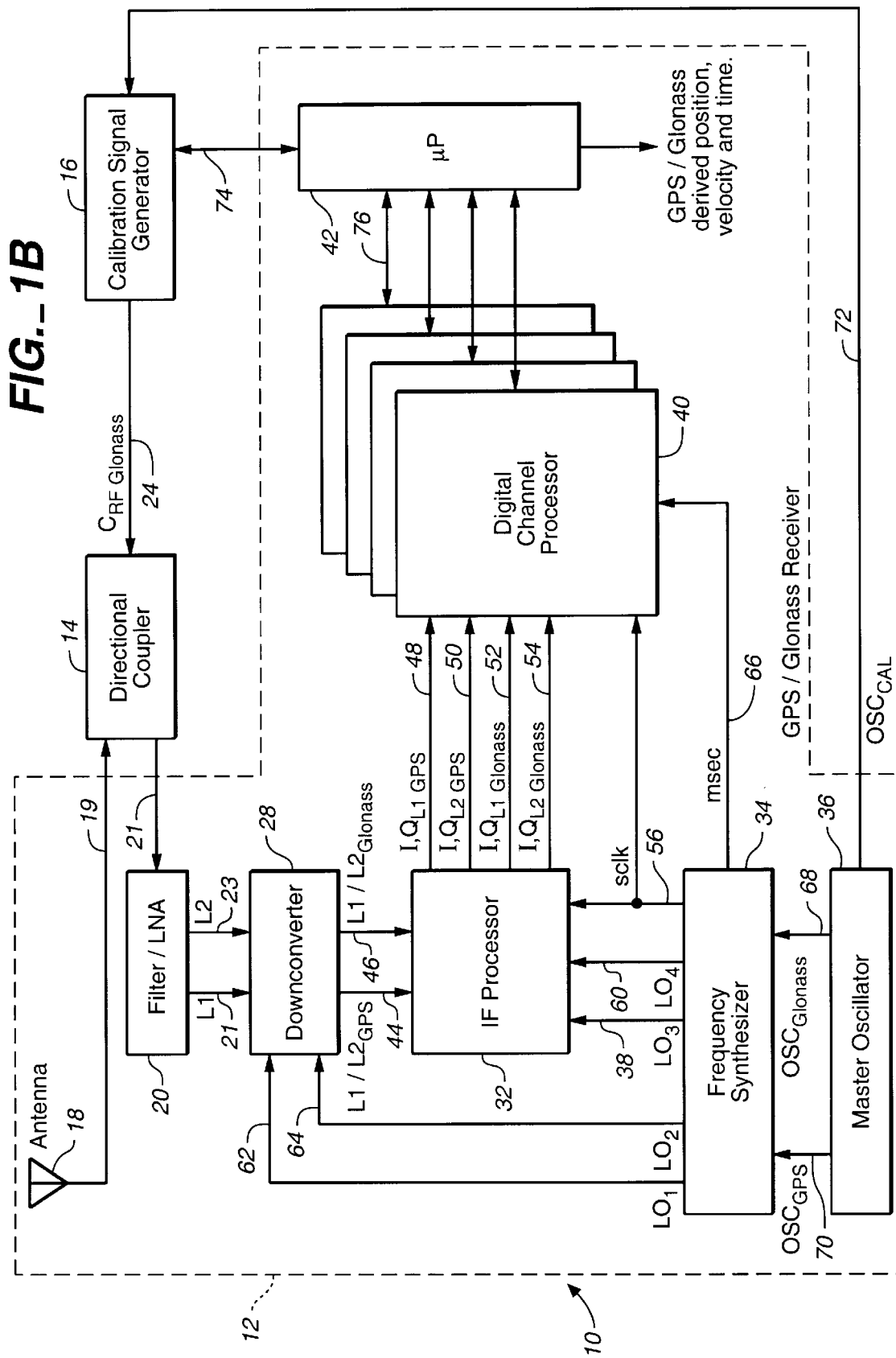
FIG._1B

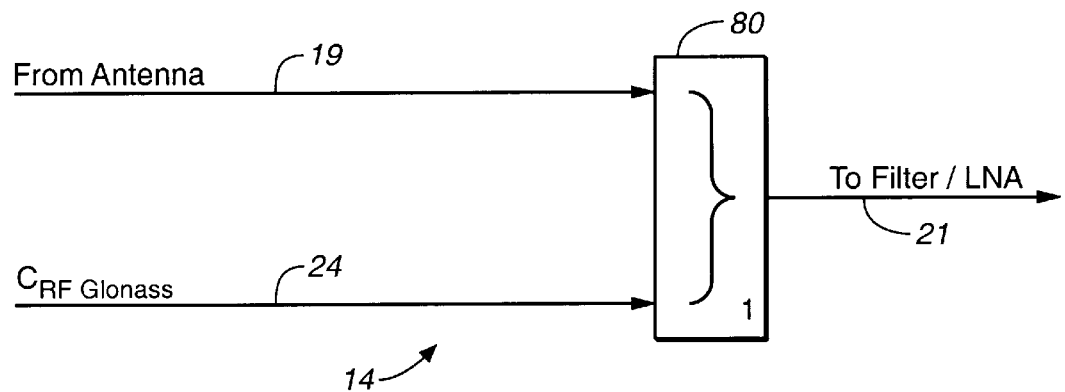
FIG._2
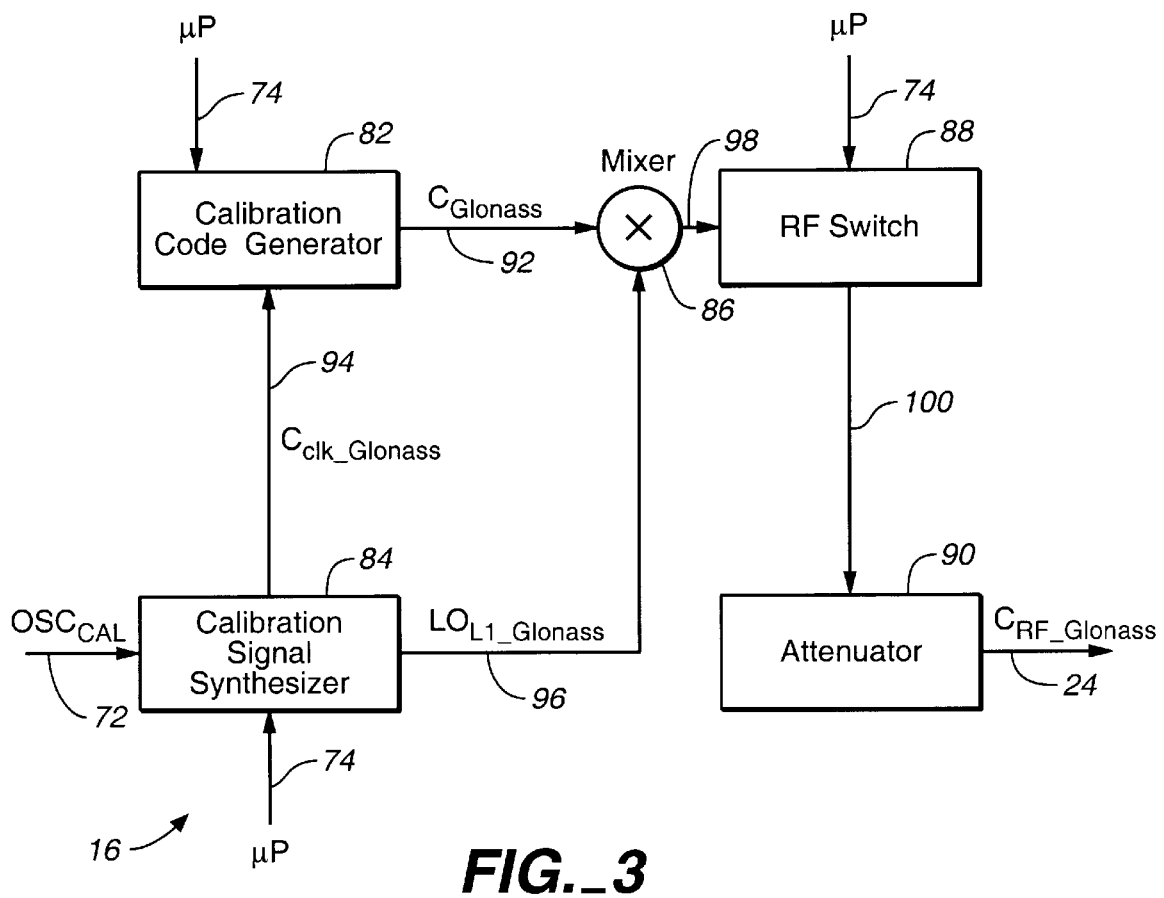
FIG._3

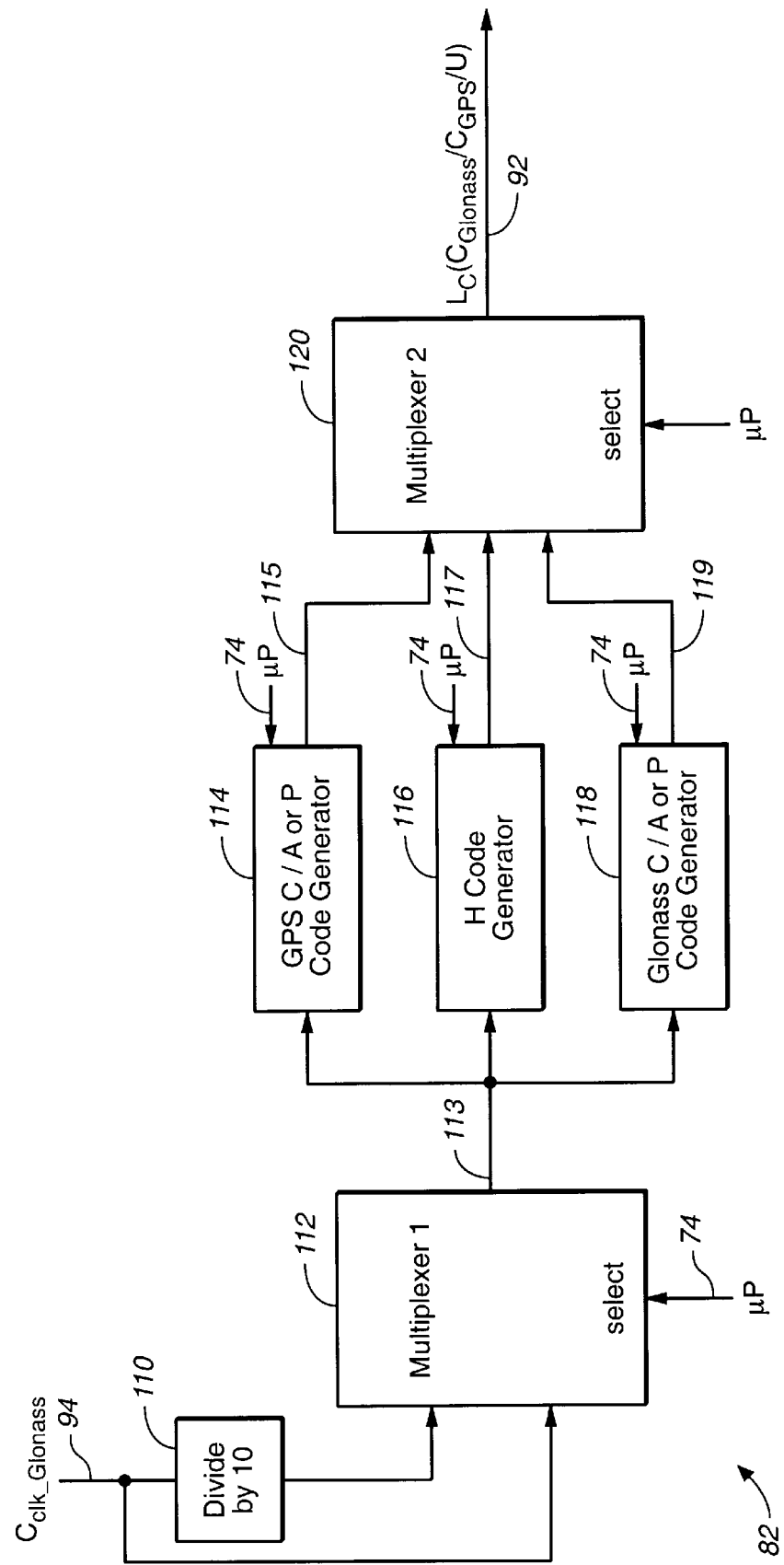
FIG._4

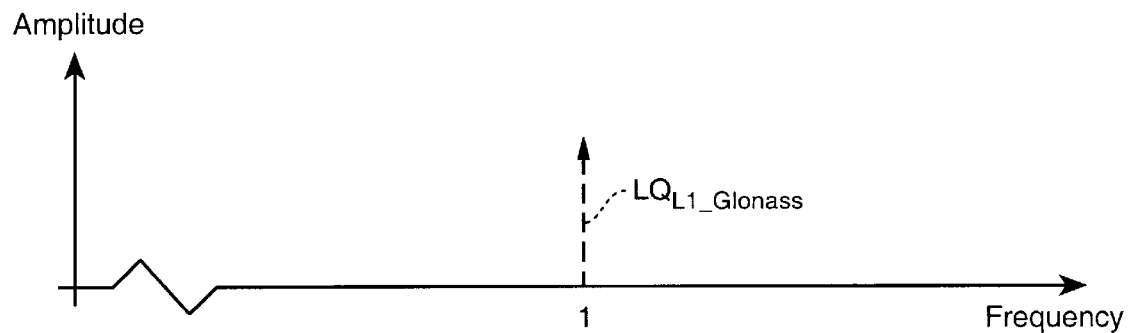
FIG._5A
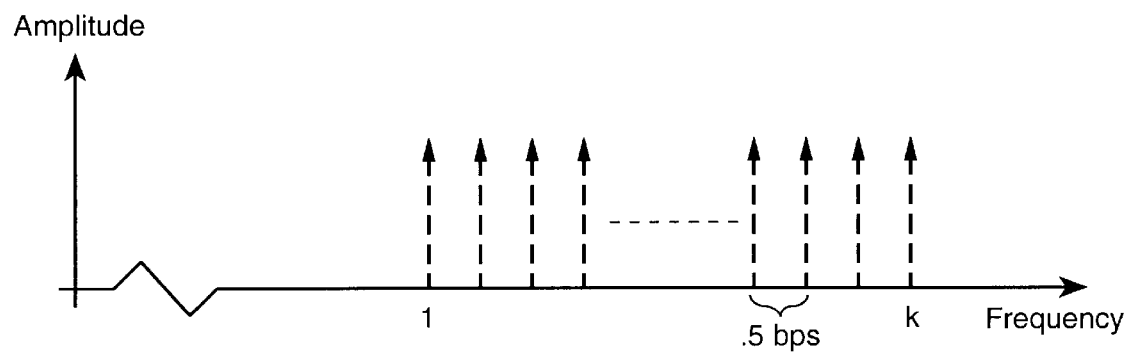
FIG._5B

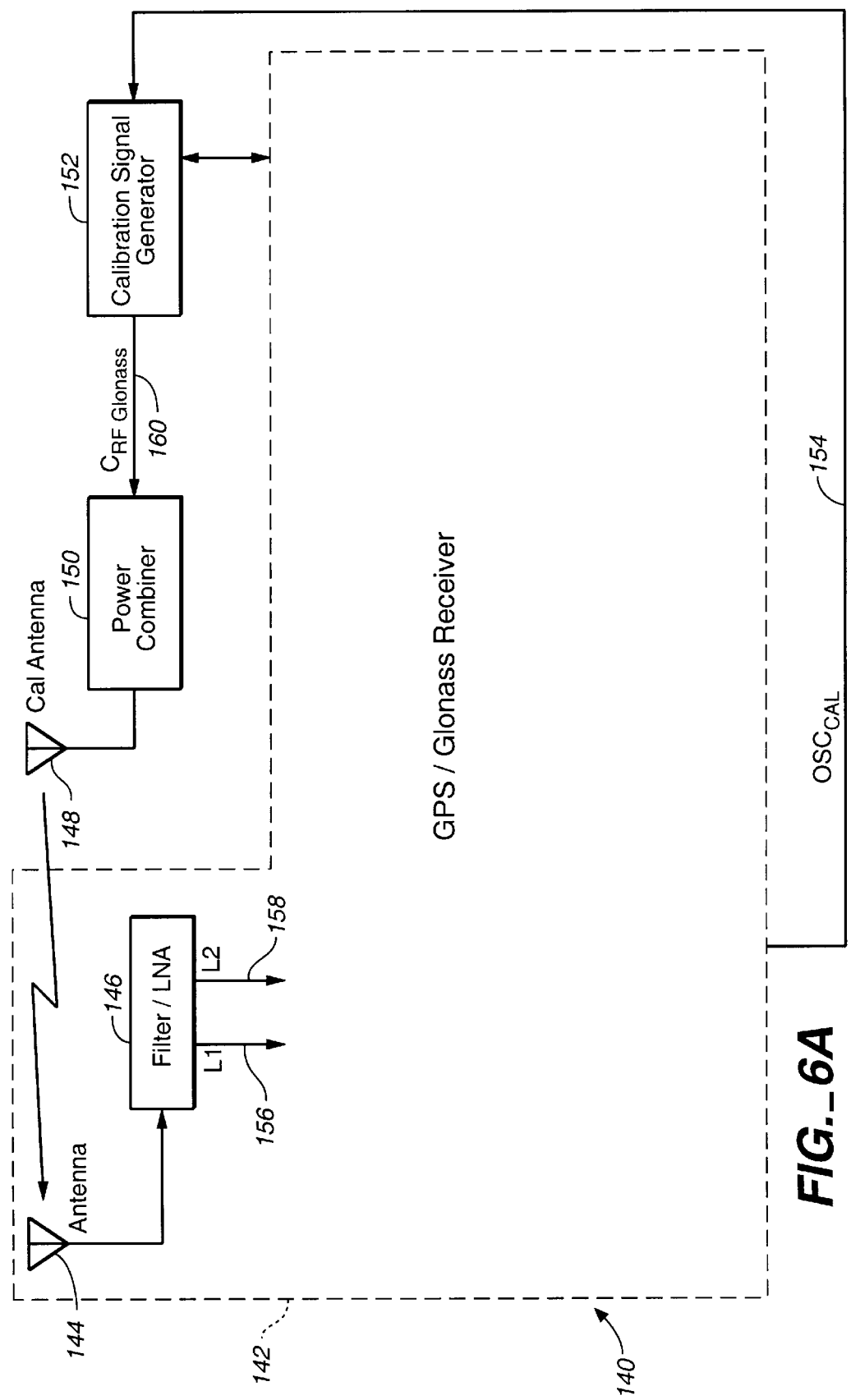
FIG._6A

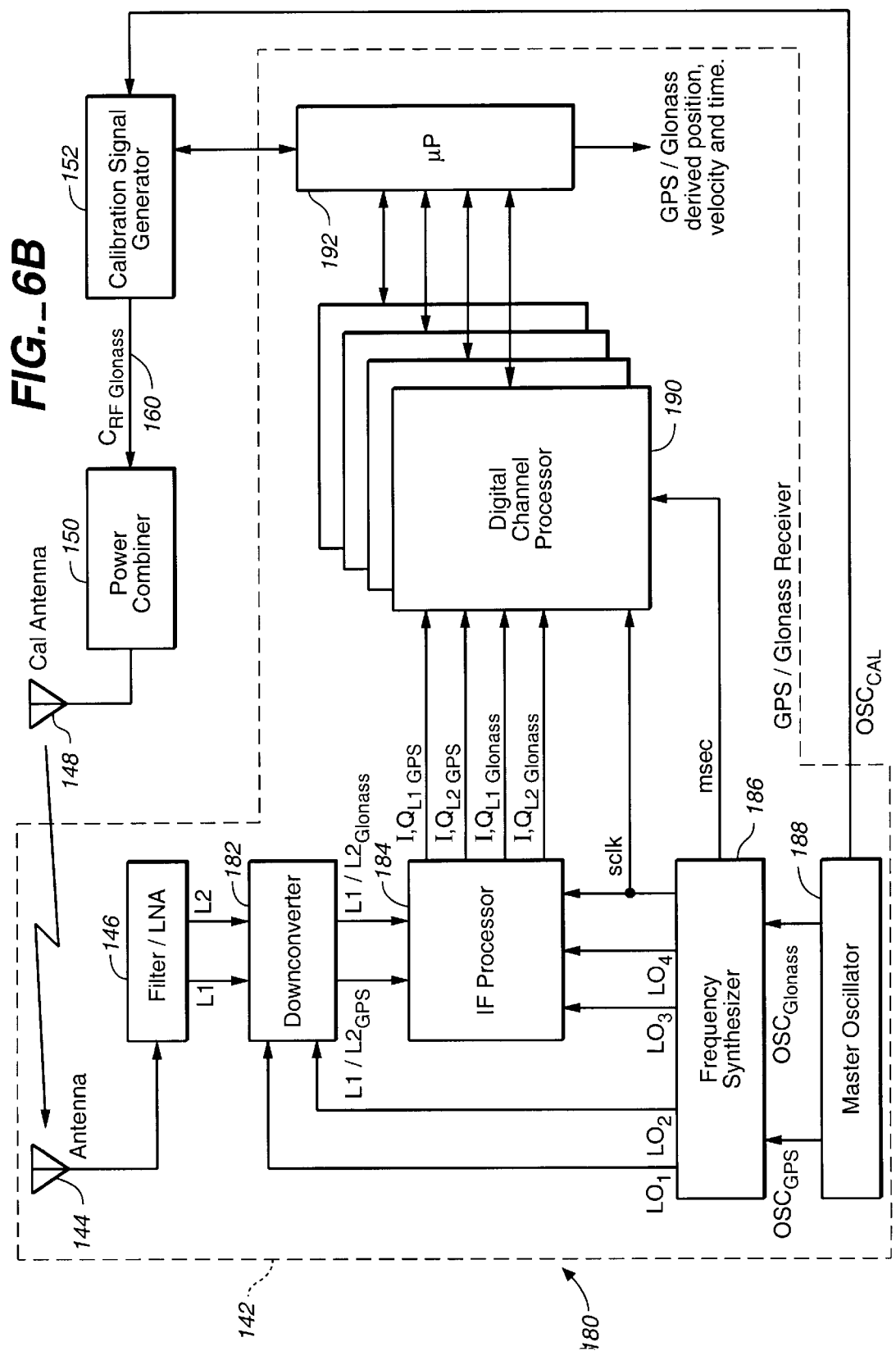
FIG._6B

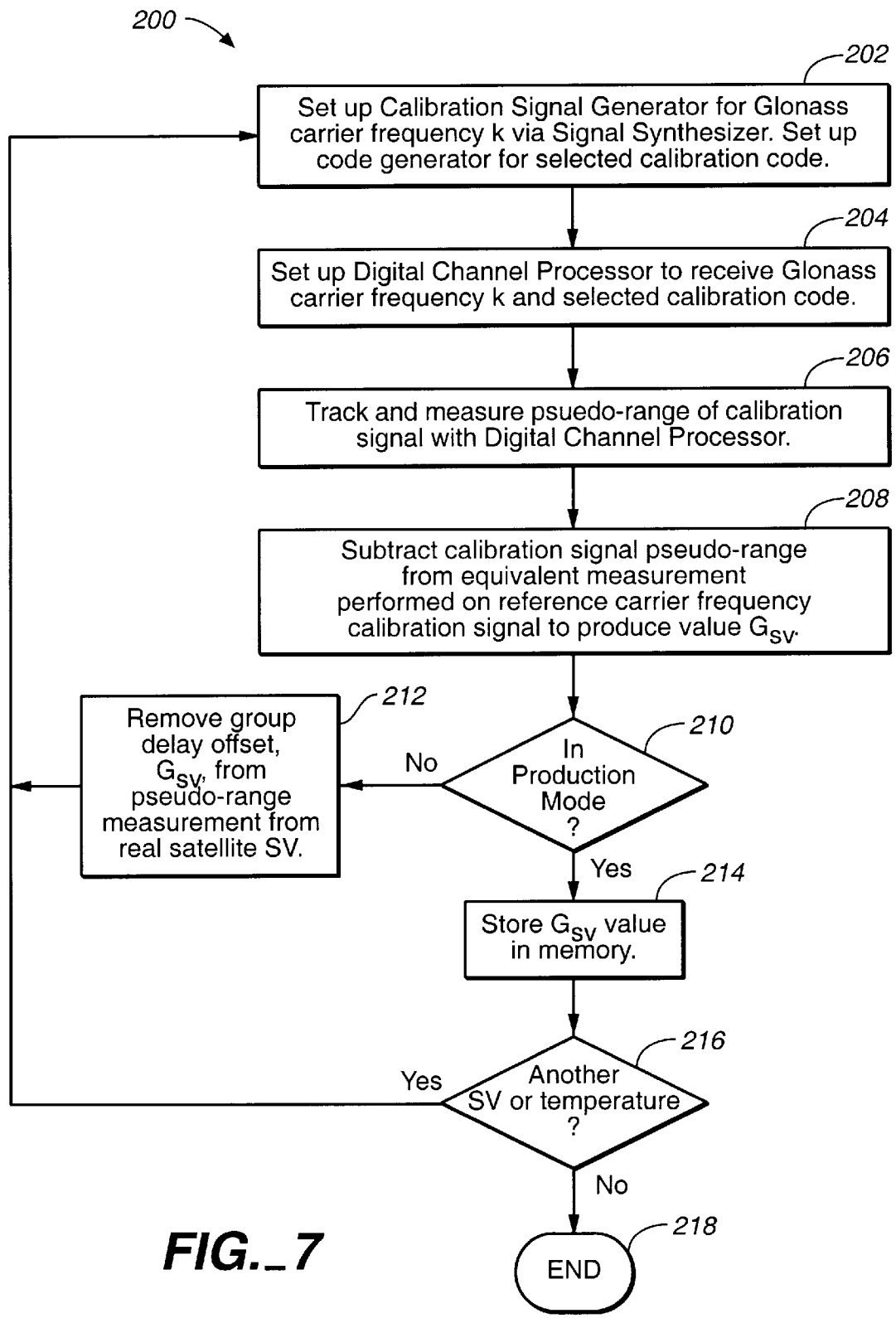
FIG._7

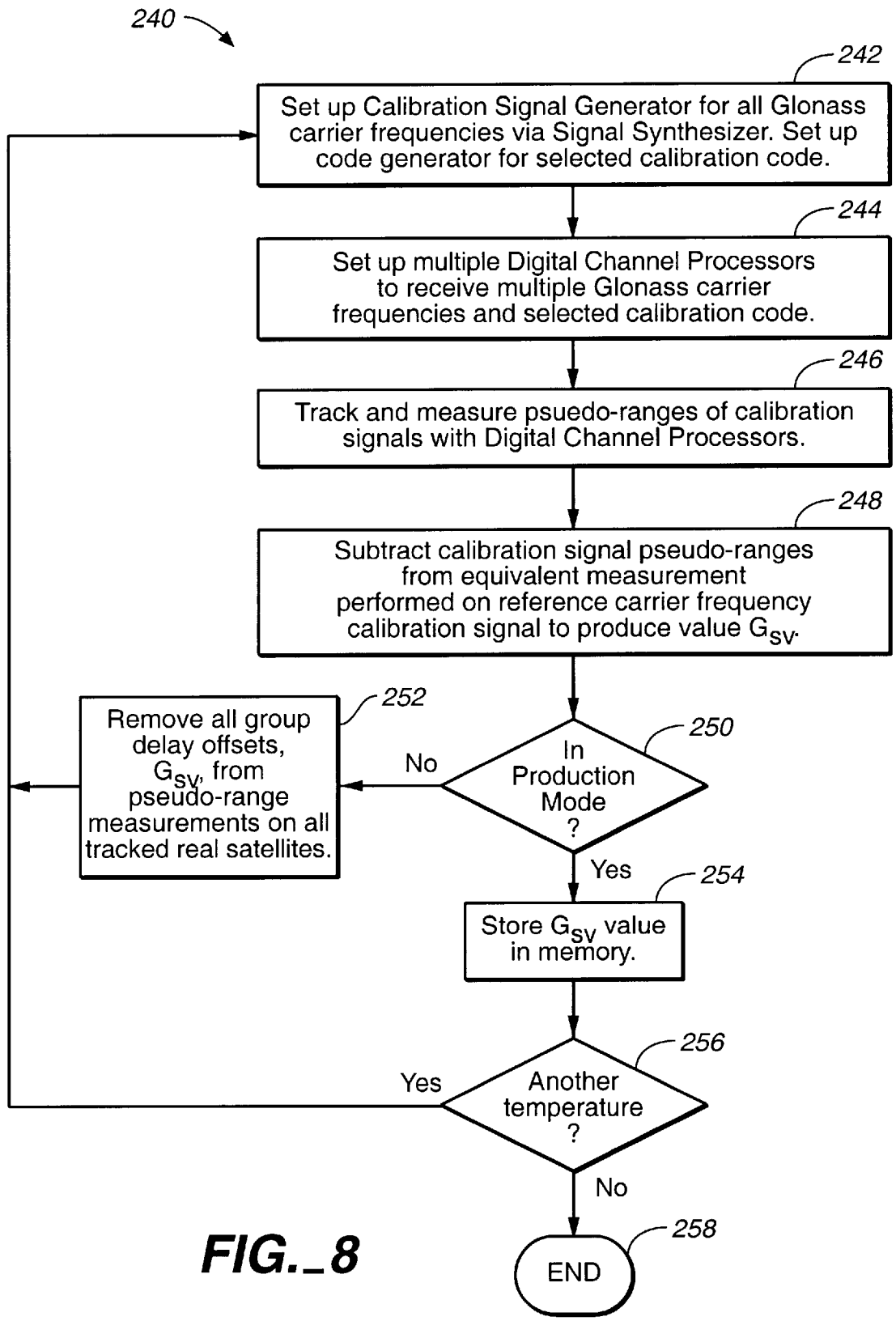
FIG._8

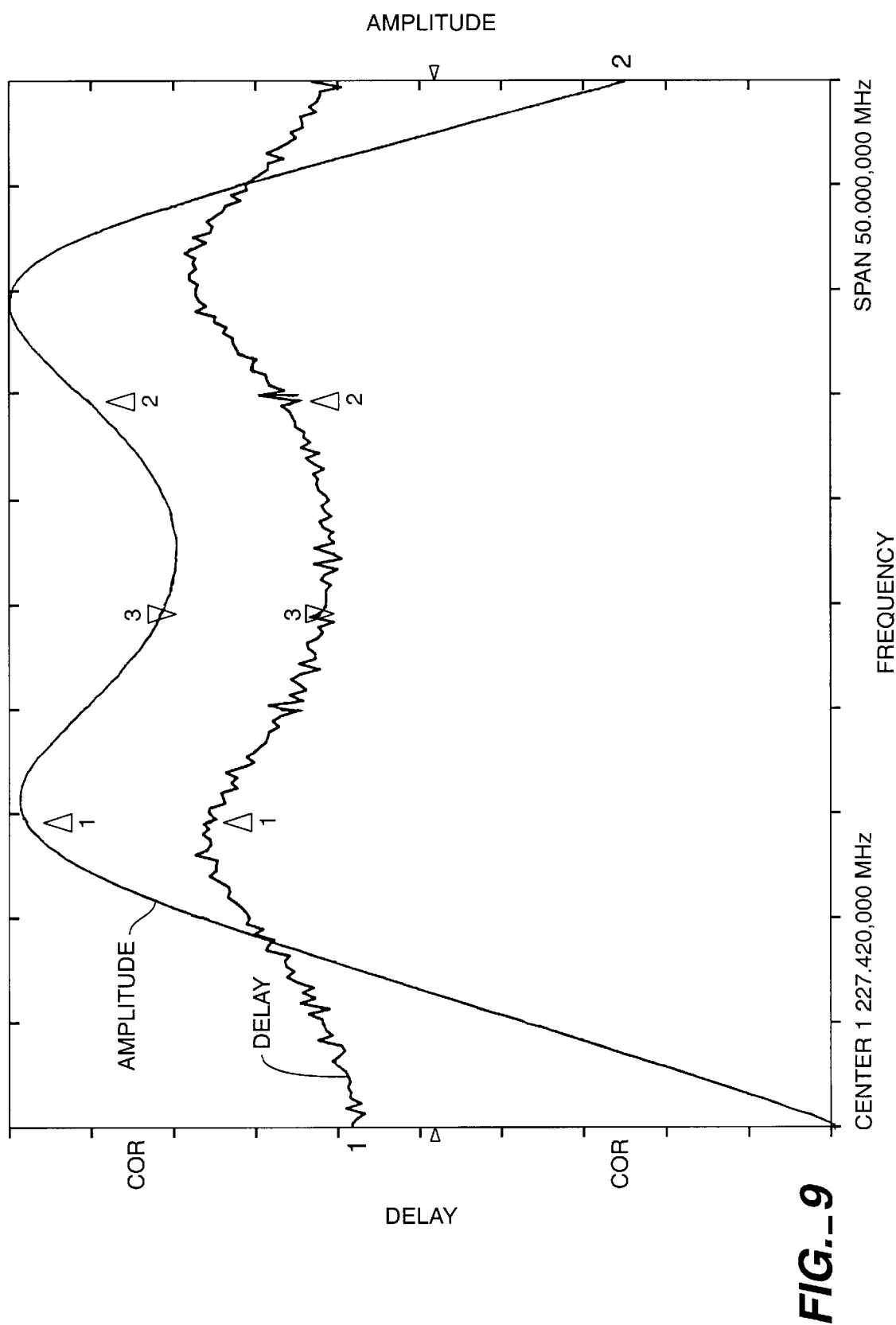
FIG._9

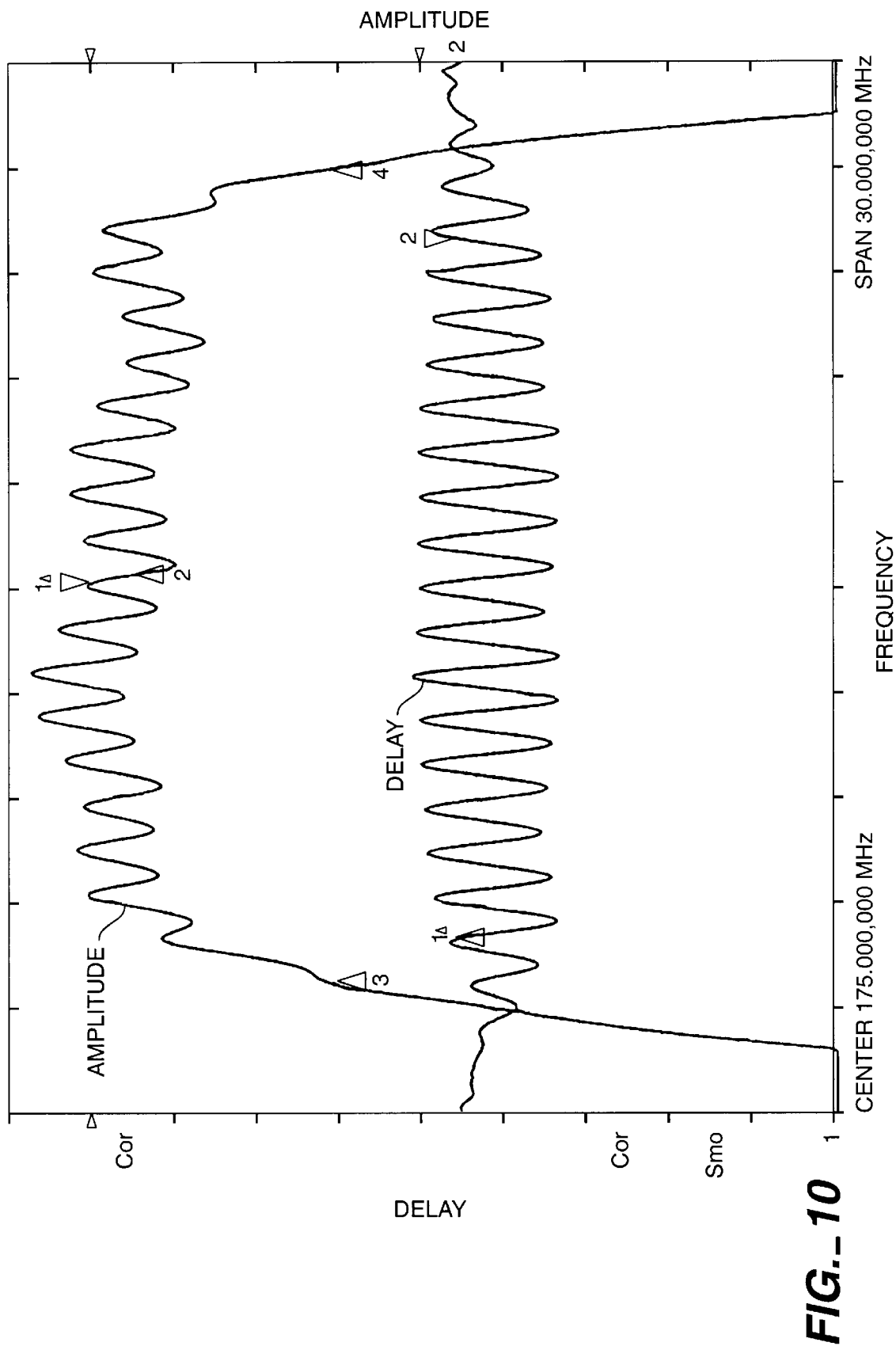
FIG._10

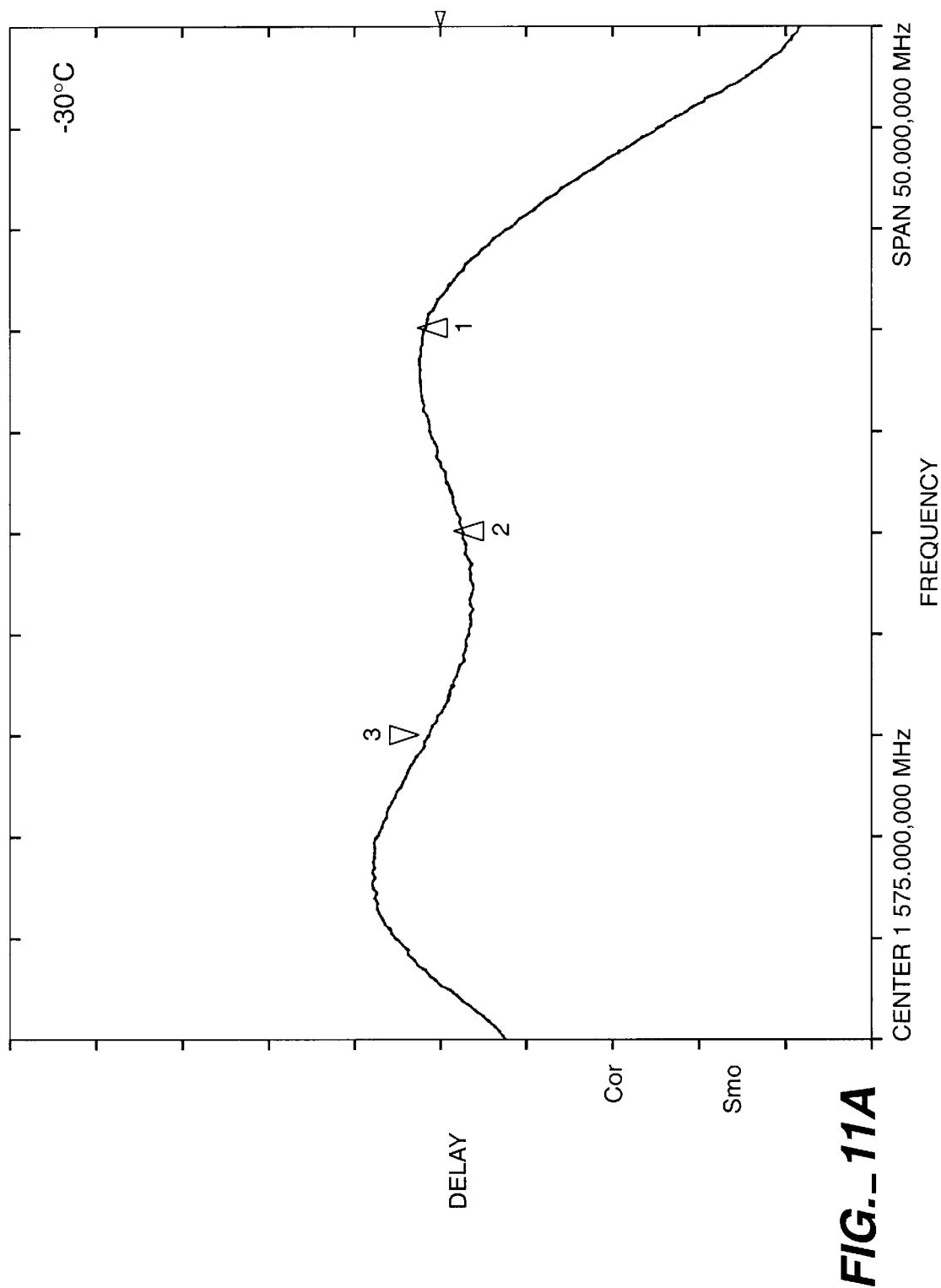
FIG._11A

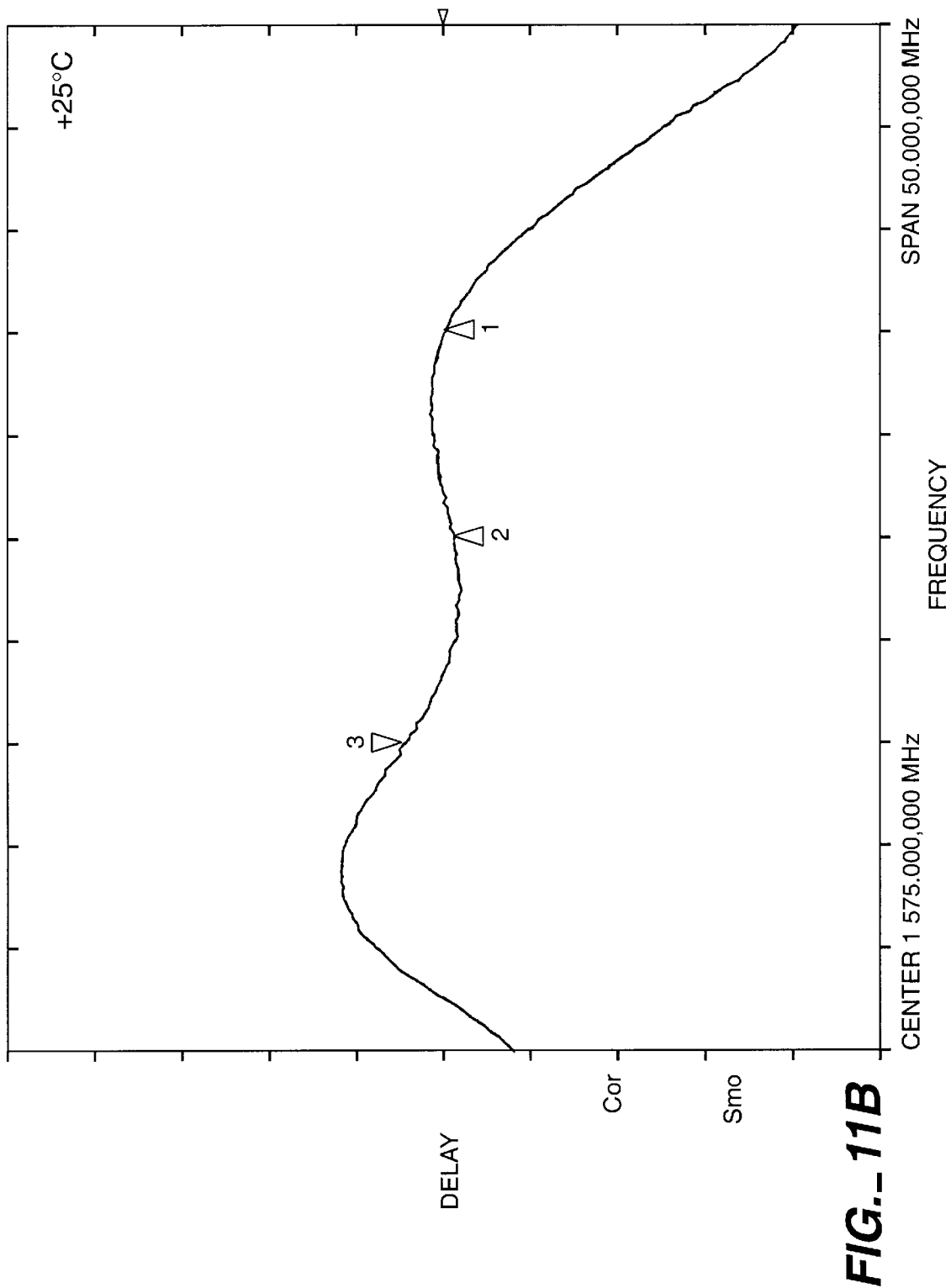
FIG._11B

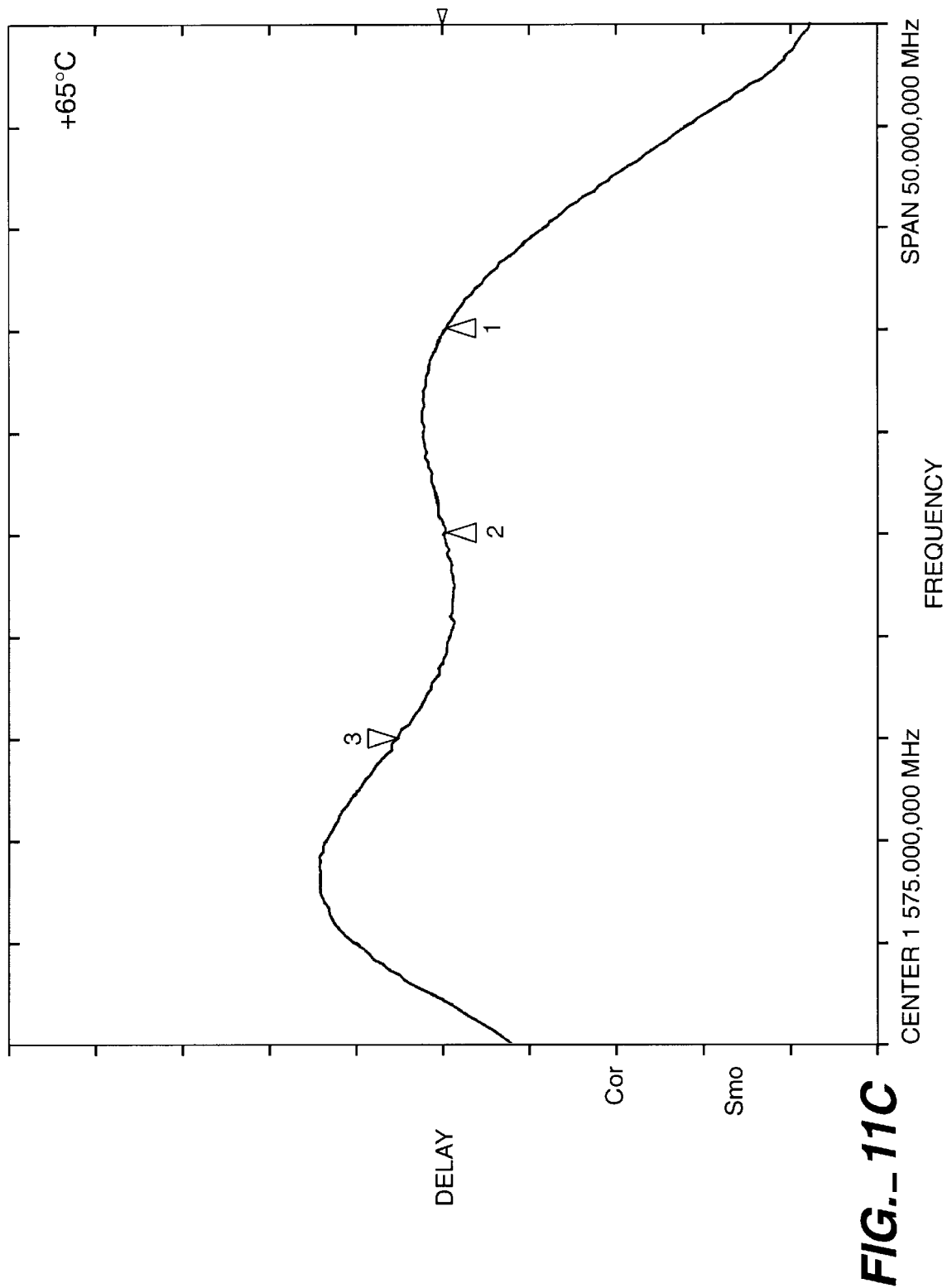
FIG._11C

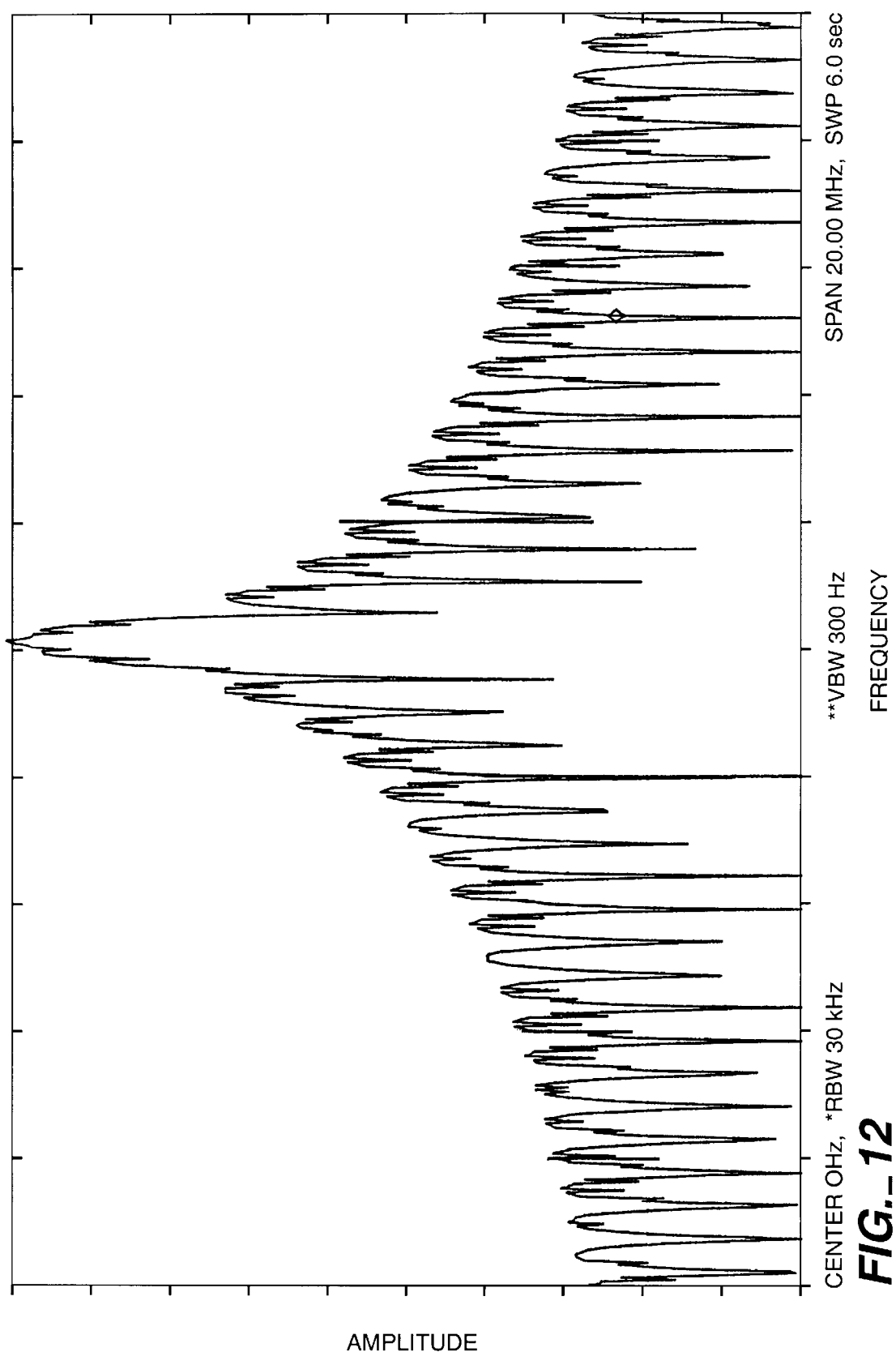
FIG._12

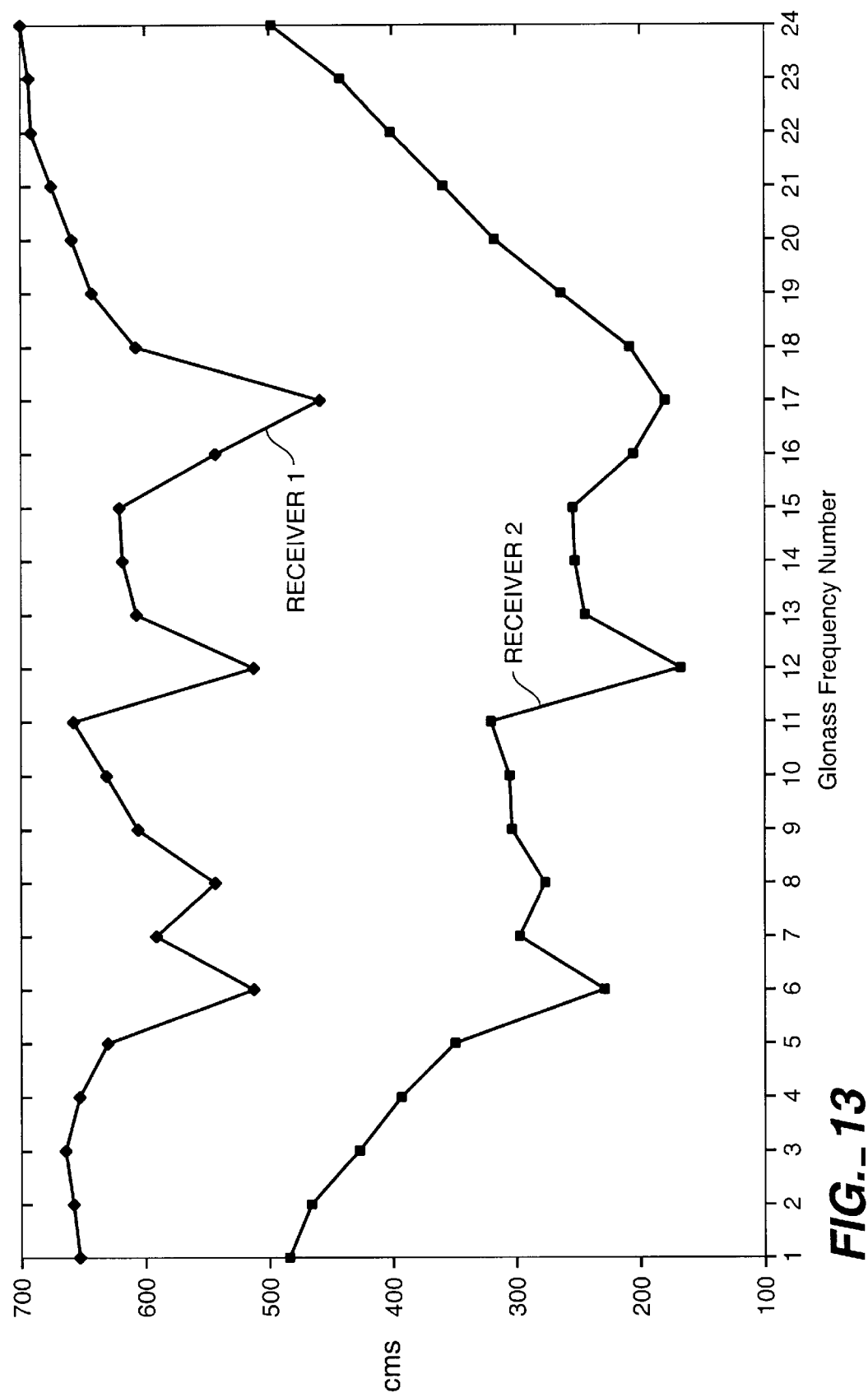
FIG._13

SIGNAL INJECTION FOR CALIBRATION OF PSEUDO-RANGE ERRORS IN SATELLITE POSITIONING SYSTEM RECEIVERS

BACKGROUND

The present patent application herein specifically refers to and incorporates in its entirety the disclosed by Gary Lennen U.S. patent application Ser. No. 08/943,552, entitled "CALIBRATION FOR CODE GROUP DELAY ERRORS IN RECEIVERS", filed on the same date as the present patent application, and assigned to the assignee of the present patent application.

Code phase (also known as pseudo-range) measurements are now commonly processed successfully in GPS Receivers to provide high accuracy position, velocity and time measurements, e.g. in differential and surveying applications. Numerous error sources in these measurement have been revealed and techniques have been developed to minimize or completely eliminate these errors. The U.S. Pat. No. 5,526,291, issued to Lennen, discloses how to solve the error in code and carrier phase caused by different Receiver designs reacting differently to the same satellite signal because the different Receiver types use different filtering, amplification and other components.

Lennen et al. in the U.S. Pat. No. 5,515,057, describes how errors in the code and carrier phase measurement caused by electrical asymmetries in the antenna element could be solved.

One important kind of the code phase error is caused by the group delay characteristics within a GPS/GLONASS Receiver. A combined GPS/GLONASS satellite positioning system Receiver was disclosed by Gary Lennen in the U.S. patent application Ser. No. 08/831,095, entitled "Combined GPS/GLONASS Satellite Positioning System Receiver", filed on Apr. 1, 1997 and assigned to the assignee of the present patent application. The U.S. patent application Ser. No. 08/831,095 is specifically referred to in the present patent application and is incorporated herein in its entirety.

The group delay code phase errors caused by variations in the group delay across the received bandwidth are due to the specific characteristics of filters, amplifiers and other active components in a GPS/GLONASS Receiver design. For instance, it is desirable for a GPS/GLONASS Receiver to include the specific filter and amplifier components that would allow for the substantial filtering of out of band signals to prevent possible jamming.

The code phase errors caused by the group delay characteristics within a satellite Receiver are more pronounced in a GLONASS Receiver than in a GPS Receiver. The GPS satellites transmit on the same nominal frequency. Thus, a GPS Receiver inflicts substantially similar and very small group delays (less than one centimeter) on the satellite signals emanating from each GPS satellite. Thus, the code phase errors caused by the group delay characteristics within a specific GPS Receiver can be largely ignored for most GPS-related applications.

On the other hand, the GLONASS satellites transmit and are received on different frequencies. When two GLONASS Receivers and two GLONASS satellite signal code phase measurements are differenced, in a double difference measurement, the group delay differences between the different GLONASS satellite signals can cause a substantial error (in the order of one meter code phase) that cannot be ignored for most GLONASS-related applications.

What is needed is the technique that would allow the satellite Receiver to maintain the active components with the specific desirable characteristics (like anti-jamming capabilities) while allowing the group delay code phase errors to be removed as an error source from the pseudo range measurements.

SUMMARY

The present invention is unique because it provides the technique for removing the group delay code phase errors from the pseudo range measurements performed by a Narrow Band satellite Receiver.

One aspect of the present invention is directed to an apparatus for calibrating the Narrow Band satellite Receiver for the group delay errors in the satellite signals emanating from at least one satellite system.

In one embodiment, the apparatus receives the satellite signals emanating from the GPS system including a plurality of GPS satellites and from the GLONASS system including a plurality of GLONASS satellites. The GPS system generates $L1_{GPS}$ and $L2_{GPS}$ signals, wherein the GLONASS system generates $L1_{GLONASS}$ and $L2_2 GLONASS$ signals.

In one embodiment, the apparatus comprises: (1) a Receiver circuit that receives the satellite signals, and (2) a Calibration circuit that generates a calibration signal. The calibration signal is used in order to calibrate the satellite Receiver circuit for pseudo-range errors caused by variations in the group delay of the received satellite signals across the received bandwidth.

In one embodiment, the Receiver circuit includes a Receiver Antenna circuit for receiving the satellite signals.

In one embodiment, the Calibration circuit further includes a Calibration Signal Generator circuit configured to generate the calibration signal.

In another embodiment, the Calibration circuit further includes: (1) a Calibration Signal Generator circuit configured to generate the calibration signal, and (2) a Directional Coupler circuit. The Directional Coupler circuit receives the calibration signal from the Calibration Signal Generator circuit, receives the satellite signals from the Receiver Antenna and combines these signals in order to generate and inject the combined signal into the Receiver circuit.

In one more embodiment, the Calibration circuit further includes: (1) a Calibration Signal Generator circuit configured to generate the calibration signal; (2) a Power Combiner circuit, and (3) a Calibration Antenna circuit. In this embodiment, the Calibration Antenna transmits the calibration signal to the Receiver Antenna.

Another aspect of the present invention is directed to a method of a serial calibration production mode. In this embodiment, a database of group delay offsets is created for the satellite signals emanating from a single satellite-vehicle.

One more aspect of the present invention is directed to a method of a parallel calibration production mode. In this embodiment, a database of group delay offsets is created for the satellite signals emanating simultaneously from a satellite system comprising a plurality of satellite-vehicles.

One additional aspect of the present invention is directed to a method of a real-time serial calibration process in order to remove in real time group delay offsets from pseudo-range measurements for satellite signals emanating from a single satellite-vehicle.

Yet, one more aspect of the present invention is directed to a method of a real-time parallel calibration process in order to remove in real time group delay offsets from pseudo-range measurements for satellite signals emanating simultaneously from a plurality of satellite-vehicles.

Yet, one additional aspect of the present invention is directed to a method of measuring an electron count of ionosphere employing a GPS/GLONASS Narrow Band Receiver and a Calibration Generator circuit. The method comprises the steps of: (a) selecting a single GPS/GLONASS satellite; (b) calibrating for an L1 GPS/GLONASS group delay using a calibration signal $C_{RF\_GPS\_L1}/C_{RF\_GLONASS\_L1}$; (c) calibrating for an L2 GPS/GLONASS group delay using a calibration signal $C_{RF\_GPS\_L2}/C_{RF\_GLONASS\_L2}$; (d) measuring a difference in time of reception between L1 and L2 GPS/GLONASS signals; and (e) determining the electron count of ionosphere that is proportional to the difference in time of reception between the L1 and L2 GPS/GLONASS signals.

BRIEF DESCRIPTION OF THE DRAWINGS

FIG. 1A depicts an apparatus for calibrating the satellite signals emanating from at least one satellite system.

FIG. 1B is a detailed illustration of the apparatus of FIG. 1A.

FIG. 2 shows the Directional Coupler.

FIG. 3 depicts the Calibration Signal Generator.

FIG. 4 illustrates the Calibration Code Generator block.

FIG. 5A shows a single carrier frequency (or serial) mode.

FIG. 5B depicts a multiple carrier frequency (or parallel) mode.

FIG. 6A illustrates an alternative embodiment of apparatus of FIG. 1A.

FIG. 6B shows an alternative embodiment of apparatus of FIG. 1B.

FIG. 7 depicts the flow chart of the serial mode of the calibration process.

FIG. 8 illustrates the flow chart of the parallel mode of the calibration process.

FIG. 9 shows the delay and amplitude variations across the bandwidth of 50 MHz for a GPS L2 Receiver having a 2-pole ceramic filter.

FIG. 10 depicts the amplitude and delay variations across the bandwidth of 30 MHz for a GPS/GLONASS Receiver having a Surface Acoustic Wave (SAW) filter.

FIG. 11A shows the effect of varying temperature on the time delay characteristics of a typical GPS/GLONASS Receiver having a 2-pole ceramic filter at (−30° C.).

FIG. 11B illustrates the effect of varying temperature on the time delay characteristics of a typical GPS/GLONASS Receiver including a 2-pole ceramic filter at (+25° C.).

FIG. 11C depicts the effect of varying temperature on the time delay characteristics of a typical GPS/GLONASS Receiver having a 2-pole ceramic filter at (+65° C.).

FIG. 12 shows a spectrum analyzer plot of signal $C_{GLONASS}$ of FIG. 4 for $C_{clk\_GLONASS}$ and GLONASS C/A code selected.

FIG. 13 is an illustration of the group delay measurement via the invented technique.

FULL DESCRIPTION OF THE PREFERRED EMBODIMENT

The GPS is a system of satellite signal transmitters, with Receivers located on the Earth's surface or adjacent to the Earth's surface, that transmits information from which an observer's present location and/or the time of observation can be determined.

The GPS is part of a satellite-based navigation system developed by the United States Defense Department under its NAVSTAR satellite program. A fully operational GPS includes up to 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, four or more GPS satellites will be visible from most points on the Earth's surface, and visual access to four or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an $L1_{GPS}$ signal having a frequency f1=1575.42 MHz and an $L2_{GPS}$ signal having a frequency f2=1227.6 MHz. These two frequencies are integral multiplies f1=1540 f0 and f2=1200 f0 of a base frequency f0=1.023 MHz. The $L1_{GPS}$ signal from each satellite is binary phase shift key (BPSK) modulated by two pseudo-random noise (PRN) codes in phase quadrature, designated as the C/A-code and P-code. The $L2_{GPS}$ signal from each satellite is BPSK modulated by only the P-code. The nature of these PRN codes is described below.

One motivation for use of two carrier signals $L1_{GPS}$ and $L2_{GPS}$ is to allow partial compensation for propagation delay of such a signal through the ionosphere, which delay varies approximately as the inverse square of signal frequency f (delay~$f^2$). This phenomenon is discussed by MacDoran in U.S. Pat. No. 4,463,357, which discussion is incorporated by reference herein. When transit time delay through the ionosphere is determined, a phase delay associated with a given carrier signal can also be determined. The phase delay which is proportional to the time difference of arrival of the modulated signals is measured in real time by cross correlating two coherently modulated signals transmitted at different frequencies $L1_{GPS}$ and $L2_{GPS}$ from the spacecraft to the Receiver using a cross correlator. A variable delay is adjusted relative to a fixed delay in the respective channels $L1_{GPS}$ and $L2_{GPS}$ to produce a maximum at the cross correlator output. The difference in delay required to produce this maximum is a measure of the columnar electron content of the ionosphere.

Use of the PRN codes allows use of a plurality of GPS satellite signals for determining an observer's position and for providing the navigation information. A signal transmitted by a particular GPS satellite is selected by generating and matching, or correlating, the PRN code for that particular satellite. Some of the PRN codes are known and are generated or stored in GPS satellite signal Receivers carried by ground observers. Some of the PRN codes are unknown.

A first known PRN code for each GPS satellite, sometimes referred to as a precision code or P-code, is a relatively long, fine-grained code having an associated clock or chip rate of 10 f0=10.23 MHz. A second known PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of f0=1.023 MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision B-PR, Jul. 3, 1991, which is incorporated by reference herein.

The GPS satellite bit stream includes navigational information on the ephemeris of the transmitting GPS satellite (which includes a complete information about the transmitting satellite within next several hours of transmission) and an almanac for all GPS satellites (which includes a less detailed information about all other satellites). The satellite information transmitted by the transmitting GPS has the parameters providing corrections for ionospheric signal propagation delays suitable for single frequency Receivers and for an offset time between satellite clock time and true GPS time. The navigational information is transmitted at a rate of 50 Baud. A useful discussion of the GPS and techniques for obtaining position information from the satellite signals is found in *The NAVSTAR Global Positioning System,* Tom Logsdon, Van Nostrand Reinhold, New York, 1992, pp. 17–90.

The Global Orbiting Navigation Satellite System (GLONASS) has been placed in orbit by the former Soviet Union and now is maintained by the Russian Republic. The GLONASS system also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals $L1_{GLONASS}$ and $L2_{GLONASS}$ with frequencies of f1=(1.602+9k/16) GHz and f2=(1.246+7k/16) GHz, where k (=1,2, . . . 24) is the channel or satellite number. These frequencies lie in two bands at 1.597–1.617 GHz ($L1_{GLONASS}$) and 1,240–1,260 GHz ($L2_{GLONASS}$). The $L1_{GLONASS}$ code is modulated by a C/A-code (chip rate= 0.511 MHz) and by a P-code (chip rate=5.11 MHz). The $L2_{GLONASS}$ code is presently modulated only by the P-code. The GLONASS satellites also transmit navigational data at a rate of 50 Baud. Because the channel frequencies are distinguishable from each other, the P-code is the same, and the C/A-code is the same, for each GLONASS satellite.

Both the GPS System and the Global Orbiting Navigation Satellite System (GLONASS) use transmission of coded radio signals, with the structure described above, from a plurality of Earth-orbiting satellites. A single antenna can receive both GPS and GLONASS signals and pass these signals to a signal Receiver/Processor, which (1) identifies the satellite source for each satellite signal, (2) determines the time at which each identified satellite signal arrives at the antenna, and (3) determines the present location of the satellite source.

The range between the location of the GPS and/or GLONASS satellite and the Receiver is equal to the speed of light c times the time difference between the Receiver's clock and the time indicated by the GPS or GLONASS satellite when it transmitted the relevant phase. However, the Receiver has an inexpensive quartz clock which is not synchronized with respect to the much more stable and precise atomic clocks carried on board the satellites. Consequently, the Receiver actually estimates not the true range to the satellite but only the pseudo-range to each GPS or GLONASS satellite.

The GPS Receiver design is disclosed by Charles Trimble in the U.S. Pat. No. 4,754,465 and the GLONASS Receiver design is disclosed by Gary Lennen in the U.S. Pat. No. 5,486,834. As was mentioned above, the combined GPS/GLONASS satellite positioning system Receiver was disclosed by Gary Lennen in the U.S. patent application Ser. No. 08/831,095, entitled "Combined GPS/GLONASS Satellite Positioning System Receiver", filed on Apr. 1, 1997 and assigned to the assignee of the present patent application.

FIG. 1A depicts an apparatus (10) for calibrating the satellite signals emanating from at least one satellite system. The apparatus (10) comprises a Narrow Band Receiver circuit (12) configured to receive the satellite signals and a Calibration circuit (22) configured to generate a calibration signal. The Narrow Band Receiver circuit (12) is configured to receive the satellite signals and the calibration signal from the Calibration circuit (22) in order to calibrate the Narrow Band Receiver circuit for pseudo-range errors caused by variations in the group delay of the received satellite signals across the received bandwidth.

A discussion of group and phase delay effects in circuit design can be found in "Network Analysis and Synthesis", by Franklin F. Kuo, second edition, published by Wiley International, 1962.

Essentially, any bandlimiting component has a non-linear group and phase delay profile with frequency. Phase delay, which impacts carrier phase measurement, refers to the delay caused by a signal traversing a Receiver components at a single frequency.

If the phase delay is not constant over the frequency range of interest, we have what is known as group delay distortion. To visualize group delay distortion more clearly, we recall from Fourier analysis that code signal is made up of different carrier frequency components. An ideal transmission system should delay each frequency components equally. In the real world of the satellite signal transmission, the carrier frequency components of the code signal are delayed by different amounts, and the reconstruction of the output signal from its Fourier components would produce a signal of different shape as the input. Thus, delay distortion is an essential design consideration of, the satellite Receiver. The group delay is sometimes called "envelope delay".

Thus, group delay, which affects code phase measurement, is a composite effect caused by a signal bandwidth's interaction with the Receiver bandwidth.

As was explained above, the GLONASS system uses two carrier signals $L1_{GLONASS}$ and $L2_{GLONASS}$ with frequencies of f1 (k)=(1.602+9k/16) GHz and f2 (k)=(1.246+7k/16) GHz, where k (=1,2, . . . 24) is the channel or satellite number. Thus, the k-th GLONASS satellite transmits signals on the f1 (k) frequency and on the f2 (k) frequency thus generating the f1 (k)- and the f2 (k)-group delays in the GLONASS Receiver. The relationship between the phase and group delays is as follows:

$$\rho(f(k)) = -d\phi(f(k))/df(k); \qquad (1)$$

wherein $\rho(f(k))$ is the group delay, $\phi(f(k))$ is the phase delay and the GLONASS satellite k-number is the external parameter.

Group delay effects are proportional to how much variation is expected from a typical Receiver components. In GPS Receiver the frequency difference between the satellites is due only to the Doppler effect and the clock frequency differences between the satellites. The maximum frequency difference between the GPS satellites is approximately (±) 10 kHz. On the other hand, the GLONASS frequency difference between the satellites can be approximately 17 MHz on L1 for satellites at opposite ends of the frequency band.

FIGS. 9 and 10 show how a typical satellite Receiver filters vary in amplitude and time delay with frequency. FIG. 9 shows the delay and amplitude variations across the bandwidth of 50 MHz for a GPS L2 Receiver having a 2-pole ceramic filter. As can be seen from FIG. 9, there is a variation of approximately 20 nanoseconds or 6 meters (after multiplying by the speed of light) in the group delay. However, for frequencies that are very close to each other (within 10 kHz), there is very little variation in the group delay.

FIG. 10 depicts the amplitude and delay variations across the bandwidth of 30 MHz for a GPS/GLONASS Receiver having a Surface Acoustic Wave (SAW) filter. The SAW filters are frequency selective, but they have very considerable delay and amplitude ripples across the frequency band. As can be seen from FIG. 10, the time delay ripples reach 50 nanoseconds (or 15 meters).

The relative group delay between GLONASS satellites in different Receivers is of interest in setting up a standard by which different Receiver manufacturers can produce equipment which will be compatible. The present invention deals with the compatibility issue by allowing the effective group delay on all satellites to be the same.

If two Narrow Band satellite Receivers have non-zero but identical group delay profiles, the Receiver will not exhibit a group delay error source because the like group delay error source will difference to zero in the double difference equations.

On the other hand, if two Narrow Band satellite Receivers have non-zero and non-identical group delay profiles, the Receiver will exhibit a group delay error source because the like group delay error source will not difference to zero in the double difference equations. The apparatus of the present invention can be used to deal with this problem. Indeed, a Narrow Band satellite receiver with a non-zero and a non-identical group delay profile can be compensated for its particular group delay profile by measuring its particular group delay profile and by offsetting this particular group delay profile at the production site. (See below the discussion of the Production mode of the usage of the present invention.) If this is the case, a Narrow Band satellite Receiver will not exhibit its particular group delay profile during its operation.

The GPS and GLONASS Receivers contain many components with complex group delay profiles that can alter significantly with temperature and aging variation in components. Thus, even the identically manufactured Receivers may not have the same effective group delays because of the components aging differently, having different temperature dependencies, and having different tolerance values. Therefore, it is desirable to have at least a temperature profiled group delay response for each satellite Receiver. FIGS. 11A, 11B, and 11C show the effect of varying temperature on the time delay characteristics of a typical GPS/GLONASS Receiver 2-pole ceramic filter.

The Receivers' antijamming protection leads to the Receiver design with the narrow bandwidth for the received signal in order to optimize the rejection of out of band interference. On the other hand, the reduction in the Receiver's variation in group delay profiles can be achieved by increasing its bandwidth. Thus, these two Receiver design objectives (the good antijamming protection and the reduction in the variation of the group delay profile) are at design odds with each other.

The present invention allows one to achieve both objectives by making the measurements of group delays and subsequently offsetting the measured group delays by injecting the calibration signal while using the Narrow Band Receiver design substantially unchanged.

It is well known (see the reference Kuo referred to above), how to relate the envelope delay to the poles and zeros of a transfer function for any electrical circuit. The shapes of the delay versus frequency characteristic are the same for all poles and zeros. The zeros contribute "negative" delay, wherein the poles, "positive" delay. Most physical systems contain both poles and zeros in their transfer functions and the location of these poles and zeros alter with temperature and components tolerance variation. Hence, in a complex electrical circuit like a GPS/GLONASS Receiver the group delay variations can be extremely difficult determine in advance.

The present invention solves this problem by allowing the group delays to be measured (in the real-time mode of operation) or profiled against temperature (in the production calibration mode of operation). See discussion below. Group delay is a non-linear effect spanning a range of frequencies and thus is difficult to measure or model unless the characteristic structure of the satellite transmission is used. Therefore, in both modes of operation, the Receiver group delay is accurately measured using a calibration signal substantially similar to that broadcast by the satellites themselves. Another important characteristic of the invention is that a typical satellite positioning system (SPS) Receiver can receive and use the calibration signal. The process of receiving the calibration signal and performing the necessary group delay measurement (via pseudo-range measurement) is substantially similar to normal Receiver tracking and measurement processes.

The present invention is disclosed in terms of GLONASS L1 signal but is equally applicable to GLONASS L2, GPS L1 and L2, or any other satellite signal received by a satellite Receiver.

In one embodiment, FIG. 1 shows an overview of how the present invention fits into the L1/L2 GPS/GLONASS Receiver described by Gary Lennen in the U.S. patent application Ser. No. 08/831,095, entitled "Combined GPS/GLONASS Satellite Positioning System Receiver" that is incorporated by reference herein in its entirety. Two additional blocks are present to enable the current invention: the Directional Coupler block (14) and the Calibration Signal Generator block (16).

The satellite signal is received by the Antenna block (18). An antenna of the type described in the U.S. Pat. No. 5,515,057 issued to Lennen et al "GPS Receiver With N-Point Symmetrical Feed Double-Frequency Patch Antenna" is appropriate if its characteristics are altered in such a way as to enable the antenna to pass the L1 GPS/GLONASS BAND and L2 GPS/GLONASS BAND. Such an antenna has stable phase and group delay characteristics suitable for high accuracy applications utilizing GPS and GLONASS satellites.

In the standard Receiver the signals are then filtered and amplified in the Filter/LNA (low noise amplifier) block (20). In the present invention the signal from the Antenna block first passes through the Directional Coupler block (14) before going onto the Filter/LNA block (20). A Directional Coupler is an electrical device which facilitates the injection of a small amount of other signal power into the direct path of a signal. The Directional Coupler is also known as a Power Combiner. The main signal path is from the Antenna block (18) to the Filter/LNA block (20). The Calibration Signal Generator block (16) generates a calibration signal (24) that is at or close to GLONASS L1 frequencies. The calibration signal (24) is combined with the satellite signals in the Directional Coupler (14).

FIG. 1B depicts the apparatus (10) of FIG. 1A in more detail. In this diagram all relevant satellite signals are illustrated. The output signals L1 (21) and L2 (23) from the Filter/LNA block (20) are downconverted in frequency in the Downconverter block (28). The signals $L1/L2_{GPS}$ (44) and $L1/L2_{GLONASS}$ (46) are further frequency translated and then digitized in the IF Processor block (32). The digital signals output from the IF Processor $I/Q_{L1\ GPS}$ (48), $I/Q_{L2\ GPS}$ (50), $I/Q_{L1\ GLONASS}$ (52) and $I/Q_{L2\ GLONASS}$ (54) are further processed in the Digital Channel Processor blocks (40), wherein each Digital Channel Processor is configured to process the satellite signals from a single GPS or GLONASS satellite.

In the preferred embodiment, the number of Digital Channel Processors is equal to the maximum number of satellites expected to be received.

In one embodiment, when the two satellite systems include the 24 satellites of the GPS system and the 24 GLONASS system satellites, the maximum number of Digital Channel Processors is 48.

In another embodiment, when the Receiver is expected to track 12 GPS satellites and 12 GLONASS satellites, the GPS/GLONASS Receiver includes 24 Digital Channel Processors.

Interaction of the Digital Channel Processor blocks (40) and the Microprocessor system μP (42) facilitates tracking of GPS and GLONASS satellites, removal of satellite data streams and measurement of code and carrier phase from each satellite.

With large numbers of Digital Channel Processor blocks (40) present it is also pertinent to have a relatively powerful Microprocessor system μP (42). The powerful Microprocessor system μP can be implemented using the Power PC family of processors manufactured by Motorola, Schaumburg, Ill.

All clocks and frequencies in the Receiver (10) associated with the frequency translation, digitization, measurement on the satellites, and generation of the calibration signal (24) are derived from a single oscillator included in the Master Oscillator block (36). Thus all measurements, whether GPS or GLONASS, can be referred to a single Receiver clock. This allows one to minimize the number of GPS/GLONASS satellites required for the position fixing. Indeed, the single oscillator used in the present invention to generate the GPS clock and the GLONASS clock has a single clock drift as opposed to the situation when two separate oscillators with two clock drifts are used to generate the GPS clock and the GLONASS clock. One additional clock drift would require one additional satellite for position fixing.

The Frequency Synthesizer block (34) is used to synthesize a number of frequencies and clocks used throughout the apparatus (10).

FIG. 2 shows the Directional Coupler (14) in more detail. The signal from the Calibration Signal Generator block $C_{RF\_GLONASS}$ (24) is combined with the signal from the Antenna (19) in the Power Combiner 1 block (80).

FIG. 3 depicts the Calibration Signal Generator (16) in more detail. The Signal Synthesizer block (84) generates all the clocks and local oscillators required by the Calibration Signal Generator, including a code clock $C_{clk\_GLONASS}$ (94) and a local oscillator signal $LO_{L1\_GLONASS}$ (96). The Code Generator (82) generates a code $C_{GLONASS}$ (92) which is subsequently frequency translated to the L1 GLONASS frequency band via $LO_{L1\_GLONASS}$ (96) signal in the Mixer block (86). The output (98) of the Mixer block (86) is input to the RF Switch (88) that can turn the signal path at its output ON or OFF under the Microprocessor μP control signal (74). The signal is then passed through an Attenuator block (90) which attenuates the signal level such that the output signal $C_{RF\_GLONASS}$ (24) is within the normal signal tracking level of the Receiver. The signal $OSC_{CAL}$ (72) is provided to allow the Calibration Signal Generator (16) to frequency lock to the Receiver's Master Oscillator (36) of FIG. 1B which significantly simplifies the acquisition and measurement of the calibration signal by the Receiver.

FIG. 4 illustrates the Calibration Code Generator block (82). The input code clock signal $C_{clk\_GLONASS}$ (94) is at a rate of 5.11 MHz for GLONASS (10.23 MHz for GPS). It is important that the calibration amplitude/frequency signal structure is similar to that of the actual satellite transmissions. To that end the Calibration Code Generator clock is chosen to be close to the satellite code clocks. The input code clock signal $C_{clk\_GLONASS}$ (94) is input to a Divide-by-10 block (110), thus allowing generation of two clocks, one at 5.11 MHz and one at 0.511 MHz, for P-code and C/A code use respectively. One of the two clocks is chosen via the Microprocessor μP control signal (74) using the Multiplexer 1 block (112). The output signal (113) of the Multiplexer 1 block is the clock signal which drives GPS (C/A or P) Code Generator block (114), H Code Generator block (116), and GLONASS (C/A or P) Code Generator block (118) that produce standard satellite codes described in references ICD-GPS-200, GLONASS ICD and "GLONASS P-code -Determination and Initial Results", by Gary Lennen. For the complete reference see the U.S. patent application Ser. No. 08/831,095, entitled "Combined GPS/GLONASS Satellite Positioning System Receiver", filed on Apr. 1, 1997. The H Code Generator (116) is provided to produce the H code (117). See discussion below. All codes are set up under μP control signal (74) and a single code is selected via Multiplexer 2 (120) for output as signal $L_C$ (92) ($C_{GLONASS}$/$C_{GPS}$/H).

FIG. 12 shows a spectrum analyzer plot of signal $C_{GLONASS}$ for $C_{clk\_GLONASS}$ and GLONASS C/A Code Generator (118) selected. Signal $C_{GLONASS}$ generated by the Calibration Code Generator (82) of FIG. 4 has the same frequency/amplitude characteristics as the GLONASS satellite signal.

Referring back to FIG. 3, the Mixer block (86) frequency translates the $C_{GLONASS}$ signal (92) to the GLONASS L1 frequency band. Thus, the spectrum of FIG. 12 is centered in the GLONASS L1 band. The Signal Synthesizer block (84) consists of phase-locked loop circuits well known in the art. The signal $C_{GLONASS}$ (92) is used to modulate the carrier signals generated by the Signal Synthesizer block (84). The output of the Signal Synthesizer block (84) comes in two basic modes. The first mode shown in FIG. 5A is a single carrier frequency (or serial) mode. In this mode, the Calibration Signal Generator (16) of FIG. 3 is capable of generating one satellite signal output $FC_{RF\_GLONASS}$ (24) at a time. In this mode, in order to measure the group delay characteristics of all possible satellites the Calibration Signal Synthesizer (84) has to be stepped sequentially between satellites (only one Digital Signal Processor is required to track this signal).

The second Calibration Signal Synthesizer (16) output mode is shown in FIG. 5B. This is a multiple carrier frequency (or parallel) mode. In this mode many satellite calibration signals can be generated at once requiring similar multiple Digital Signal Processor for reception. Serial mode is preferred when the attempts made to minimize the hardware components of the apparatus of FIG. 1A because in this mode only one Digital Signal Processor and a simplified Signal Synthesizer block is required. Parallel mode is preferred when it is desirable to increase the accuracy of the resulting pseudo-range measurements (because each satellite calibration gets more observation time) at the expense of requiring more Digital Signal Processors and a more complex Signal Synthesizer design.

An important and critical requirement (in terms of accuracy) for the analogue components used in the design of the Calibration Signal Generator (16) of FIG. 3 is that the analogue components should have constant group delay characteristics across the frequency bands of interest (that is primarily across the GLONASS L1 and GLONASS L2 bands). This requirement is possible to satisfy in the Calibration Signal Generator because we are not concerned with rejecting out of band interference. Indeed, the out of band filtering in the normal satellite receiving path will perform out of band rejection on the Calibration Signal Generator output. Hence, we are free to make the Mixer block (86) of FIG. 3, the RF Switch block (88) of FIG. 3, the Attenuator block (90) of FIG. 3 and the Directional Coupler block (14) of FIG. 1A resistant to variation in time delay. Thus the Calibration Signal Generator can be designed using the high accuracy components with wide bandwidth. The ability of the calibration Signal Generator to resist time delay variation across the bandwidth of interest relative to the Receiver's normal path time delay variation will dictate the degree of improvement in the ability of the apparatus of FIG. 1A to measure and compensate for the group delay. An important characteristic of the present invention is that the generated code $C_{GLONASS}$ (92) of FIG. 3 is identical for all calibrated satellite channels. Since the generated code $C_{GLONASS}$ (92) is being received and measured as pseudo-range, the generated code $C_{GLONASS}$ (92) is identical for all carrier frequencies as the output of the Mixer (86) and subsequent Calibration Signal Generator blocks are invariant in group delay across the GLONASS L1 (or GLONASS L2) band. As a general rule, a wide bandwidth components causes that components to have small variation in group delay within its bandwidth. Thus, the Mixer block (86) and subsequent blocks of the Calibration Signal Generator can be chosen to have exceptionally wide bandwidth around the GLONASS L1 (GLONASS L2) band. If the Calibration Signal Generator had significant variation in group delay across the GLONASS L1 band, the present invention technique would not be able to separate this effect from the Receiver's group delay profile we are trying to measure. Therefore, for the GLONASS L1 band centered around 1.6 GHz, we can employ the commonly available Mixers, RF Switches, Attenuators, and Directional Couplers with bandwidth in the range 500 MHz to 4 GHz.

The present invention can be practiced in the real time mode. In the real time mode the calibration signal is injected into the Receiver while it is operational.

The present invention can be also practiced in Production mode. In Production mode each Receiver is calibrated at the factory as part of the manufacturing process such that the operational Receiver is not required to contain the Calibration Signal Generator and accompanying circuitry. The Production mode involves subjecting each Receiver to calibration across the temperature range of interest such that each Receiver is loaded via software with a table containing the group delay for each satellite and a profile of how it varies with temperature. The calibration measurement can be made in a temperature controlled chamber (that can be commonly found in the manufacturing facilities) at several temperatures. The calibration process at the arbitrary temperature within the industrial temperature range (−40° C. through 85° C.) can be interpolated. In Production mode the Receiver (12) of FIG. 1A additionally includes a temperature sensor (23). However, in Production mode the Receiver (12) does not have to receive simultaneously the real satellite signals (19) and the calibration signal (24). The Receiver is required to receive only the calibration signal in the Production mode of operation.

It is important to prevent the Calibration Signal Generator from jamming the Receiver in the real time mode of operation. (In the Production mode jamming is not a problem because the Receiver is required to receive only the calibration signal). Referring back to FIG. 3, the Attenuator block (90) should be set to allow minimal signal power detection of the Calibration Signal Generator in the Receiver's Digital Signal Processors. The Receiver should use one or more of its channels to track the calibration signal and hence the power of the calibration signal (24) should be high enough for the tracking purposes. Locking to the calibration signal is easier to achieve than locking to the real satellite signal because the carrier and code frequencies of the calibration signal are precisely known to the Receiver. Indeed, the calibration signal has been frequency locked via signal $OSC_{CAL}$(72) of FIG. 3. There are also no environmental effects to allow for signal blockages and interference due to atmospheric effects.

One can achieve the antijamming protection by using the RF Switch block (88) of FIG. 3 to turn ON or OFF the Calibration Signal Generator output signal (100) under the Microprocessor $\mu P$ (42) control signal (74) in such a way that when it is OFF no Receiver interference occurs. The Receiver's Digital Channel Processors (40 of FIG. 1B) can have their Correlators blocks strobed in synchronism with the RF Switch ON/OFF cycle such that only the Digital Channel Processors assigned to Calibration Signal Generator reception observe this signal, and the Digital Channel Processors assigned to track satellites observe only the real satellite signals. This operation can be performed with the previously described Receiver's hardware by having the Microprocessor $\mu P$ (42), which reads the Correlators at a rate msec (66), using only complete msec correlation sums which have the RF Switches ON in tracking the calibration signal and similarly using only calibration sums when the RF Switch is OFF for real satellite tracking. This will result in a small but acceptable signal loss when the Correlators set for satellite reception are not enabled. For instance, having the calibration signal ON for 10% of the time will result in approximately 1 dB of loss in satellite signal power available. It is important with this technique to ensure that a correlator sum is accumulated across a complete C/A period (if C/A calibration is required) to retain the C/A codes complete code signature. This is not a problem with P codes which are much more random in nature because of their increased length.

Another technique for reducing interference is to ensure that the carrier frequency of the calibration signal is offset from the satellite signal carrier frequency. The satellite carrier frequency is known because the Receiver is tracking the satellite. The Signal Synthesizer output frequency of the Calibration Signal Generator can be set to produce a calibration signal at the received frequency plus or minus 10 kHz (for example). This procedure ensures that the calibration signal appears as zero mean noise to a Digital Channel Processor tracking a satellite. We cannot offset the calibration signal carrier frequency too far (e.g. 1 MHz) from the satellite carrier frequency as the Receiver time delay characteristics can change substantially across this frequency range.

One more technique for avoiding self-jamming in the real time mode of operation is to use a code other than one that is transmitted by the real satellite. FIG. 4 shows the generators of three different codes. If we wish to calibrate for GLONASS L1 C/A code (C/A and P code require separate calibration because they have significantly different bandwidth and signal structure) then using a GLONASS C/A code for real-time calibration may interfere with real satellite reception. If this particular case, the suitable alternative would be to use a GPS C/A or GPS P code clocked as the GLONASS C/A code rate of 0.511 MHz. This minimizes cross-correlation between calibration and real satellite signals but maintains substantially similar amplitude/frequency signal structure characteristics because they are clocked at the GLONASS C/A code rate. This use of GPS codes for GLONASS calibration (and visa versa) is convenient because Receivers are typically capable of receiving these codes. FIG. 4 shows also the H Code Generator (116) which represents yet another code chosen for its minimal cross-correlation properties with the GLONASS L1 C/A code. The Received should be capable of generating a local replica of the H code. Possible examples of H code include Maximal Length Shift Register sequences and other Gold Code Sequences.

The present invention has been described with respect to the calibration signal being injected after the Antenna block and before the Filter/LNA block in the apparatus (10) of FIG. 1A. This is possible because the antenna electrical properties do not usually vary significantly with temperature.

If it is not the case, and there is a significant variation in an antenna's electrical properties, the present invention could be alternatively described in another embodiment shown in FIG. 6A. The apparatus of FIG. 6A includes all elements of the apparatus (10) of FIG. 1A and additionally the Calibration Antenna (148) that injects the calibration signal into the normal receiving Antenna (144). The Calibration Antenna (148) should have the property of being relatively invariant in its time delay characteristics and should not substantially interfere electrically with the normal receiving Antenna (144). The embodiment of the present invention shown in FIG. 6A can be utilized in both Production and real time modes of operation. See discussion above. FIG. 6B depicts the apparatus (140) of FIG. 6A in more detail.

In one embodiment, when only the GLONASS satellites are used for the navigation purposes, the Calibration Circuit should be configured to generate the calibration signal substantially similar to the GLONASS signals (but free from the group delay errors) in order to calibrate the GLONASS rf channel of the combined GPS/GLONASS Receiver for errors caused by variations in the group delay of the GLONASS satellite signals across the received bandwidth in the GPS/GLONASS combined satellite Receiver.

FIG. 7 shows the calibration measurement process for serial calibration using a single calibration generator carrier frequency to sequence between GLONASS satellites on L1.

The method (200) can be used of a serial calibration production mode in order to create a database of group delay offsets in a Production mode of operation, or, alternatively, to offset group delay in a real time mode of operation.

In step (202), the Calibration Signal Generator is set up for GLONASS carrier frequency $L0_{L1\_GLONASS}$ via the Signal Synthesizer. The Calibration Code Generator is set up for selected calibration code $C_{GLONASS}$. In step (204), the Digital Channel Processor is set up to receive GLONASS carrier frequency k and selected calibration code via its Carrier and Code NCOs, and Code Generator Blocks. The calibration signal is tracked by the Digital Signal Processor and a pseudo-range measurement is taken (step 206). This pseudo-range is subtracted from a designated reference measurement in the step (208) to produce the value of the group delay $G_{SV}$. This reference is arbitrary and is designed to relate measurement on all frequencies to the calibration measurement.

If it is the Production mode (210), the group delay $G_{SV}$ measurement are stored in the computer memory (214). In the next step (216) we make a decision as to whether to repeat the process on another satellite vehicle SV and/or at another temperature. If the group delay $G_{SV}$ measurements are performed for all SV and all temperatures and the table in memory is complete then the process is ended (218). The Receiver will then subtract the group delay $G_{SV}$ measurement values from pseudo-ranges measured on real satellites for a given Receiver's temperature profile.

For non-production mode (real time mode) the group delay measurements $G_{SV}$ are used to remove group delay errors from tracked satellite pseudo-ranges. The Receiver automatically compensates for its current temperature in this mode.

FIG. 8 depicts the flow chart (240) of the parallel mode for the calibration measurement process. In this case all group delay corrections are measured simultaneously and there is no requirement to sequence. In step (242), the Calibration Signal Generator is set up for all GLONASS carrier frequencies $L0_{L1\_GLONASS}$ via the Signal Synthesizer. The Calibration Code Generator is set up for selected calibration code $C_{GLONASS}$. In step (244), the multiple Digital Channel Processor are set up to receive multiple GLONASS carrier frequencies and selected calibration code via its Carrier and Code NCOs, and Code Generator Blocks. The calibration signal is tracked by the Digital Signal Processor and pseudo-range measurements are taken (step 246). These pseudo-ranges are subtracted from a designated reference measurement in the step (248) to produce the value of the group delays $G_{SV}$ for multiple GLONASS satellites.

In the Production mode (250) the described above process significantly reduces the amount of time required to calibrate a unit. In a non-Production mode (252) the measurements are significantly more accurate because of increased observation time.

In another embodiment, when only the GPS satellites are used for the navigation purposes, the Calibration Circuit should be configured to generate the calibration signal substantially similar to the GPS signals (but free from the group delay errors) in order to calibrate the GPS rf channel of the combined GPS/GLONASS Receiver for errors caused by variations in the group delay of the GPS satellite signals across the received bandwidth in the GPS/GLONASS combined satellite Receiver. In this particular situation, as was stated above, the group delay is benign unless very precise measurements are needed.

Yet, in one embodiment, both the GPS satellites and the GLONASS satellites are used for the navigation purposes. In this embodiment, there is a receiver dependent group delay because the GLONASS Receiver rf channel is different from the GPS Receiver rf channel. In this embodiment, the GPS Receiver rf channel of the GPS/GLONASS Receiver receives the GPS satellite signals, the GLONASS Receiver rf channel of the GPS/GLONASS Receiver receives the GLONASS satellite signals.

In this embodiment, the Calibration Circuit should be able to generate two different calibration signals. The first calibration signal selected via Multiplexer 2 (120) for output as signal $L_C(92)=C_{GPS}$ is the GPS calibration signal substantially similar to the GPS signals in order to calibrate the GPS rf channel of the combined GPS/GLONASS Receiver for GPS group delay errors. The second calibration signal selected via Multiplexer 2 (120) for output as signal $L_C(92)= C_{GLONASS}$ is the GLONASS calibration signal substantially similar to the GLONASS signals in order to calibrate the GLONASS rf channel of the combined GPS/GLONASS Receiver for GLONASS group delay errors. The methods of serial or parallel calibration in real time or in Production mode are described above.

FIG. 13 is an illustration of the group delay measurements via the invented technique. Two graphs are shown, each one representing a different Receiver. Ideally, each of these graphs should be completely flat for zero Receiver dependent group delay error between satellites on different frequencies. As shown in FIG. 13, these graphs are substantially none-flat and Receiver dependent. The Y-axis on this graph is a calibration pseudo-range, the X-axis is a carrier frequency number. It is worth mentioning, that the absolute group delay is unimportant, it is the relative delay between different carrier frequencies that matters. Making the graphs of FIG. 13 flat allows for inter-operability of different Receiver manufacturers equipment as all manufactures are forced to make the error source a flat line as far as the real satellite pseudo-ranges are concerned, thus removing the effect of Receiver dependent group delay variations on GLONASS pseudo-ranges.

The present invention can be also used for measuring an electron count of ionosphere. Indeed, a GPS/GLONASS Narrow Band Receiver and a Calibration Generator circuit can be used as a physical device for mesuaring an electron count of ionosphere in the following way.

At first, one has to select a single GPS (GLONASS) satellite.

The process of calibration the GPS/GLONASS Receiver for the L1 or L2 GPS (GLONASS) group delays using the corresponding calibration signals $C_{RF\_GPS\_L1}$ ($C_{RF\_GLONASS\_L1}$) or $C_{RF\_GPS\_L2}$ ($C_{RF\_GLONASS\_L2}$) was discussed above.

After calibrating the GPS/GLONASS Receiver for an L1 GPS (L1 GLONASS) group delay using a calibration signal CRF $G_{RF\_GPS\_L1}$($C_{RF\_GLONASS\_L1}$) and after calibrating the GPS/GLONASS Receiver for an L2 GPS (L2 GLONASS) group delay using a calibration signal $C_{RF\_GPS\_L2}$ ($C_{RF\_GLONASS\_L2}$), one can measure a difference in time of reception by the GPS./GLONASS Receiver between the L1 and L2 GPS (GLONASS) signals.

The electron count of the column of ionosphere between the selected GPS (GLONASS) satellite and the GPS/GLONASS Receiver is proportional to the measured difference in time of reception bewteen said L1 and L2 GPS (GLONASS) signals.

The description of the preferred embodiment of this invention is given for purposes of explaining the principles thereof, and is not to be considered as limiting or restricting the invention since many modifications may be made by the exercise of skill in the art without departing from the scope of the invention.

What is claimed is:

1. An apparatus for calibrating a Narrow Band satellite Receiver for group delay errors in a satellite signal; said apparatus comprising:

a Narrow Band satellite Receiver circuit configured to receive said satellite signal;

and a Calibration circuit configured to generate a calibration signal;

wherein said calibration signal is used to calibrate said Narrow Band satellite Receiver circuit for pseudo-range errors caused by variations in the group delay of said received satellite signal across the received bandwidth.

2. The apparatus of claim 1; wherein said Narrow Band Receiver circuit further includes:

a Receiver Antenna circuit for receiving said satellite signal.

3. The apparatus of claim 1; wherein said Narrow Band Receiver circuit further includes:

a Temperature Sensor.

4. The apparatus of claim 2, wherein said Calibration circuit further includes:

a Calibration Signal Generator circuit configured to generate said calibration signal.

5. The apparatus of claim 2, wherein said Calibration circuit further includes:

a Calibration Signal Generator circuit configured to generate said calibration signal; and a Directional Coupler circuit connected to said Calibration Signal Generator circuit in order to receive said calibration signal and connected to said Receiver Antenna circuit in order to receive said satellite signal;

wherein said Directional Coupler is configured to combine said satellite signals with said calibration signal in order to generate a combined signal and in order to inject said combined signal into said Narrow Band satellite Receiver circuit.

6. The apparatus of claim 2, wherein said Calibration circuit further includes:

a Calibration Signal Generator circuit configured to generate said calibration signal;

a Power Combiner circuit connected to said Calibration Signal Generator circuit; and a Calibration Antenna circuit connected to said Power Combiner Circuit;

wherein said Calibration Antenna is configured to transmit said calibration signal to said Receiver Antenna.

7. The apparatus of claim 2, wherein said Receiver Antenna receives said satellite signals from the GPS system including a plurality of GPS satellites and from the GLONASS system including a plurality of GLONASS satellites, and wherein the GPS system generates $L1_{GPS}$ and $L2_{GPS}$ signals, wherein said GLONASS system generates $L1_{GLONASS}$ and $L2_{GLONASS}$ signals; and wherein said Receiver circuit further includes:

a Filter/LNA circuit conductively connected to said Receiver Antenna, wherein said Filter/LNA is configured to perform the filtering and low noise amplification of said $L1_{GPS}$, $L2_{GPS}$, $L1_{GLONASS,}$ and $L2_{GLONASS}$ signals; wherein said Filter/LNA determines the signal-to-noise (SNR) ratio of the received signals;

a Downconverter circuit conductively connected to said Filter/LNA, wherein said Downconverter is configured to convert down in frequency said $L1_{GPS}$, $L2_{GPS}$, $L1_{GLONASS}$, and $L2_{GLONASS}$ signals;

an IF processor conductively connected to said Downconverter, wherein said IF processor is configured to further frequency translate and digitize said $L1_{GPS}$, $L2_{GPS}$, $L1_{GLONASS}$, and $L2_{GLONASS}$ signals;

a plurality of Digital Channel Processor circuits connected to said Receiver circuit, wherein each said Digital Channel Processor is configured to process satellite signals emanating from a single satellite; and a Microprocessor connected to each said Digital Channel Processor, wherein said Microprocessor is configured to generate control signals and is configured to extract the navigational information from each said received satellite signal.

8. The apparatus of claim 7 further comprising a Master Oscillator block configured to generate a single clock frequency MASTER_CLK, a GPS clock frequency $OSC_{GPS}$, a GLONASS clock frequency $OSC_{GLONASS}$, and a calibration clock frequency $OSC_{CAL}$, wherein said GPS clock frequency $OSC_{GPS}$, said GLONASS clock frequency $OSC_{GLONASS}$, and said calibration clock frequency $OSC_{CAL}$ are all derived from said single clock frequency MASTER_CLK.

9. The apparatus of claim 8 further comprising a Frequency Synthesizer connected to said Master Oscillator, wherein said Frequency Synthesizer is configured to synthesize $L0_1$, $L0_2$, $L0_3$, $L0_4$, msec, and sclk clock signals.

10. The apparatus of claim 4, wherein said Calibration Signal Generator further comprises:

a Calibration Signal Synthesizer configured to generate a code clock signal $C_{clk\_GLONASS}$, a code clock signal $C_{clk\_GPS}$, a local oscillator signal $L0_{L1\_GLONASS}$, a local oscillator signal $L0_{L2\_GLONASS}$, a local oscillator signal $L0_{L1\_GPS}$, and a local oscillator signal $L0_{L2\_GPS}$, wherein said code clock signal $C_{clk\_GLONASS}$, said code clock signal $C_{clk\_GPS}$, said local oscillator signal $L0_{L1\_GLONASS}$, said local oscillator signal $L0_{L2\_GLONASS}$, said local oscillator signal $L0_{L1\_GPS}$, and said local oscillator signal $L0_{L2\_GPS}$ are locked to said calibration clock frequency $OSC_{CAL}$ signal under control of a Microprocessor;

a Calibration Code Generator connected to said Calibration Signal Synthesizer, wherein said Calibration Code Generator is configured to generate a local code $C_{GLONASS}$ and a local code $C_{GPS}$;

a Mixer connected to said Calibration Signal Synthesizer and connected to said Calibration Code Generator, wherein said Mixer is configured to frequency translate said local code $C_{GLONASS}$ signal using said $L0_{L1\_GLONASS}$ signal into an L1_GLONASS signal, said local code $C_{GLONASS}$ signal using said $L0_{L2\_GLONASS}$ signal into an L2_GLONASS signal, said local code $C_{GPS}$ signal using said $L0_{L1\_GPS}$ signal into an L1_GPS signal, and said local code $C_{GPS}$ signal using said $L0_{L2\_GPS}$ signal into an L2_GPS signal;

an RF Switch block coupled to said Mixer, wherein said RF Switch block is configured to pass said L1_GLONASS signal, said L2_GLONASS signal, said L1_GPS signal, or said L2_GPS signal under the control of said Microprocessor; and an Attenuator block connected to said RF Switch block, wherein said Attenuator is configured to generate a calibration signal $C_{RF\_GLONASS\_L1}$, a calibration signal $C_{RF\_GLONASS\_L2}$, a calibration signal $C_{RF\_GPS\_L1}$, or a calibration signal $C_{RF\_GPS\_L2}$.

11. The apparatus of claim 10, wherein said Calibration Code Generator further comprises:

a Divide-by-10 block configured to divide said GLONASS calibration signal $C_{clk\_GLONASS}$, or said GPS calibration signal $C_{clk\_GPS}$ in order to generate a $C_{clk\_P\_GLONASS}$ clock signal, a $C_{clk\_C/A\_GLONASS}$ clock signal, a $C_{clk\_P\_GPS}$ clock signal, or a $C_{clk\_C/A GPS}$ clock signal;

a Multiplexer 1 connected to said Divide-by-10 block, wherein said Multiplexer 1 block is configured to select a $C_{clk\_P\_GLONASS}$ clock signal, a $C_{clk\_C/A\_GLONASS}$ clock signal, a $C_{clk\_P\_GPS}$ clock signal, or a $C_{clk\_C/A\_GPS}$ clock signal;

a GPS C/A code generator connected to said Multiplexer 1, wherein said GPS C/A code generator is configured to generate a GPS C/A code signal under the control signal of said Microprocessor $\mu P$;

a GPS P(Y) code generator connected to said Multiplexer 1, wherein said GPS P(Y) code generator is configured to generate a GPS P(Y) code signal under the control signal of said Microprocessor $\mu P$;

a GLONASS C/A code generator connected to said Multiplexer 1, wherein said GLONASS C/A code generator is configured to generate a GLONASS C/A code signal under the control signal of said Microprocessor $\mu P$;

a GLONASS P code generator connected to said Multiplexer 1, wherein said GLONASS P code generator is configured to generate a GLONASS P code signal under the control signal of said Microprocessor $\mu P$;

an H Code generator connected to said Multiplexer 1, wherein said H code generator is configured to generate an H code signal under the control signal of said Microprocessor $\mu P$; and a Multiplexer 2 configured to select a single local code $L_C$ from said GPS C/A, said GPS P(Y), said GLONASS C/A, said GLONASS C/A, or said H locally generated codes.

12. A method of a serial calibration production mode in order to create a database of group delay offsets of the received at temperature $T_1$ satellite signals emanating from a satellite-vehicle $SV_i$, a satellite system comprising a plurality of N satellite-vehicles $SV_i$, N being an integer, i being an integer less or equal to N, said temperature $T_1$ being within the range of temperatures $[T_0, T_c]$, said method comprising the steps of:

(a) generating a calibration signal by a Calibration Signal Generator;

(b) receiving satellite signals from said satellite-vehicle $SV_i$ by a Receiver including a single Digital Channel Processor;

(c) tracking and measuring said satellite signals at said temperature $T_1$ to measure a pseudo-range from said Receiver to said satellite-vehicle $SV_i$;

(d) tracking and measuring said calibration signal at said temperature $T_1$ to measure a calibration-pseudo-range from said Receiver to said satellite-vehicle $SV_i$;

(e) subtracting for said satellite-vehicle $SV_i$ at said temperature $T_1$ said calibration-pseudo-range from said pseudo-range to generate a group delay offset $G_{SVi/T}$;

(f) storing said group delay offset $G_{SVi/T}$ measured at said temperature $T_1$ for said satellite-vehicle $SV_i$ in a computer memory;

(g) repeating steps (a–f) for each said "i" satellite-vehicle $SV_i$, i being less or equal to N; and (h) repeating steps (a–g) for another temperature $T_2$ within the range of temperatures $[T_0, T_c]$.

13. A method of a real-time serial calibration process in order to remove group delay offsets $G_{SVi}$ from pseudo-range measurements for satellite signals emanating from a satellite-vehicle $SV_i$, a satellite system comprising a plurality of N satellite-vehicles $SV_i$, N being an integer, i being an integer less or equal to N, said method comprising the steps of:

(a) generating a calibration signal by a Calibration Signal Generator;

(b) receiving satellite signals from said satellite-vehicle $SV_i$ by a Receiver including a single Digital Channel Processor;

(c) tracking and measuring said satellite signals to measure a pseudo-range from said Receiver to said satellite-vehicle $SV_i$;

(d) tracking and measuring said calibration signal to measure a calibration-pseudo-range from said Receiver to said satellite-vehicle $SV_i$;

(e) subtracting for said satellite-vehicle $SV_i$ said calibration-pseudo-range from said pseudo-range to generate a group delay offset $G_{SVi}$;

(f) removing said group delay $G_{SVi}$ from pseudo-range measurements for satellite signals emanating from said satellite-vehicle $SV_i$; and (g) repeating steps (a–f) for each said "i" satellite-vehicle $SV_i$, i being less or equal to N.

14. A method of a parallel calibration production mode in order to create a database of group delay offsets at temperature $T_1$ satellite signals emanating from a satellite system comprising a plurality of N satellite-vehicles $SV_i$, N being an integer, i being an integer less or equal to N, said temperature $T_1$ being within the range of temperatures [$T_0$, $T_c$], said method comprising the steps of:

(a) generating a calibration signal by a Calibration Signal Generator;

(b) receiving satellite signals from each said satellite-vehicle $SV_i$ by a Receiver including a plurality of Digital Channel Processors;

(c) tracking and measuring each said satellite signal at said temperature $T_1$ to measure pseudo-ranges from said Receiver to each said satellite-vehicle $SV_i$;

(d) tracking and measuring said calibration signal at said temperature $T_1$ to measure calibration pseudo-ranges from said Receiver to each said satellite-vehicle $SV_i$;

(e) subtracting for each said satellite-vehicle $SV_i$ at said temperature $T_1$ said calibration pseudo-range from said pseudo-range to generate a plurality of N group delay offsets $G_{SVi/T1}$;

(f) storing each said group delay offset $G_{SVi/T1}$ measured at said temperature $T_1$ for each said satellite-vehicle $SV_i$ in a computer memory ; and (g) repeating steps (a–f) for another temperature $T_2$ within the range of temperatures [$T_0$, $T_c$].

15. A method of a real-time parallel calibration process in order to remove group delay offsets $G_{SVi}$ from pseudo-range measurements for satellite signals emanating from a plurality of satellite-vehicles $SV_i$, said method comprising the steps of:

(a) generating a calibration signal by a Calibration Signal Generator;

(b) receiving satellite signals from each said satellite-vehicle $SV_i$ by a Receiver including a plurality of Digital Channel Processors;

(c) tracking and measuring said satellite signals to measure pseudo-ranges from said Receiver to each said satellite-vehicle $SV_i$;

(d) tracking and measuring said calibration signal to measure calibration-pseudo-ranges from said Receiver to each said satellite-vehicle $SV_i$;

(e) subtracting for each said satellite-vehicle $SV_i$ said calibration-pseudo-range from said pseudo-range to generate a plurality of N group delay offsets $G_{SVi}$; and (f) removing from pseudo-range measurements of satellite signals emanating from each said satellite-vehicle $SV_i$ said group delay $G_{SVi}$.

16. A method for calibration a Narrow Band GLONASS satellite Receiver for group delay errors in satellite signals emanating from at least one GLONASS satellite, said method comprising the steps of:

(a) receiving said at least one GLONASS satellite signal;

(b) tracking and measuring said at least one GLONASS satellite signal to measure pseudo-ranges from said Narrow Band GLONASS satellite Receiver to each said GLONASS satellite;

(c) generating a GLONASS calibration signal for each said GLONASS satellite;

(d) tracking and measuring said GLONASS calibration signal to measure calibration-pseudo-ranges from said Narrow Band GLONASS satellite Receiver to each said GLONASS satellite; and (e) subtracting for each said GLONASS satellite said GLONASS calibration-pseudo-range from said GLONASS pseudo-range in order to remove from pseudo-range measurements of each said GLONASS satellite signal said GLONASS group delay.

17. A method for calibration a combined Narrow Band GPS/GLONASS satellite Receiver for group delay errors in satellite signals emanating from at least one GPS satellite and from at least one GLONASS satellite, said method comprising the steps of:

(a) receiving said at least one GPS satellite signal utilizing a GPS rf channel of said combined Narrow Band GPS/GLONASS satellite Receiver;

(b) tracking and measuring said at least one GPS satellite signal to measure pseudo-ranges from said combined Narrow Band GPS/GLONASS satellite Receiver to each said GPS satellite;

(c) generating a GPS calibration signal for each said GPS satellite;

(d) tracking and measuring each said GPS calibration signal to measure calibration-pseudo-ranges from said combined Narrow Band GPS/GLONASS satellite Receiver to each said GPS satellite;

(e) subtracting for each said GPS satellite said GPS calibration-pseudo-range from said GPS pseudo-range in order to remove from pseudo-range measurements of said GPS satellite signal said GPS group delay;

(f) receiving said at least one GLONASS satellite signal utilizing a GLONASS rf channel of said combined Narrow Band GPS/GLONASS satellite Receiver;

(g) tracking and measuring said at least one GLONASS satellite signal to measure pseudo-ranges from said combined Narrow Band GPS/GLONASS satellite Receiver to each said GLONASS satellite;

(h) generating a GLONASS calibration signal for each said GLONASS satellite;

(i) tracking and measuring said GLONASS calibration signal to measure calibration-pseudo-ranges from said combined Narrow Band GPS/GLONASS satellite Receiver to each said GLONASS satellite; and (j) subtracting for each said GLONASS satellite said GLONASS calibration-pseudo-range from said GLONASS pseudo-range in order to remove from pseudo-range measurements of each said GLONASS satellite signal said GLONASS group delay.

18. A method of measuring an electron count of ionosphere employing a GPS/GLONASS Narrow Band Receiver and a Calibration Generator circuit, said method comprising the steps of:

(a) selecting a single GPS/GLONASS satellite;

(b) calibrating for an L1 GPS/GLONASS group delay within said GPS/GLONASS Narrow Band Receiver using a calibration signal $C_{RF\_GPS\_L1}/C_{RF\_GLONASS\_L1}$;

(c) calibrating for an L2 GPS/GLONASS group delay within said GPS/GLONASS Narrow Band Receiver using a calibration signal $C_{RF\_GPS\_L2}/C_{RF\_GLONASS\_L2}$;

(d) measuring a difference in time of reception between said calibrated for said group delay within said GPS/GLONASS Narrow Band Receiver L1 and L2 GPS/GLONASS signals; and (e) determining said electron count of ionosphere that is proportional to said difference in time of reception between said caliobrated for said group delay within said GPS/GLONASS Narrow Band Receiver L1 and L2 GPS/GLONASS signals.

19. The method of claim 18; wherein said step of calibrating for said L1 GPS/GLONASS group delay within said GPS/GLONASS Narrow Band Receiver using said calibration signal $C_{RF\_GPS\_L1}/C_{RF\_GLONASS\_L1}$ further includes the steps of:

(a) tracking and locking on an L1 GPS/GLONASS satellite signal using said GPS/GLONASS Narrow Band Receiver; and (b) generating said calibration signal $C_{RF\_GPS\_L1}/C_{RF\_GLONASS\_L1}$ using said Calibration Generator circuit.

20. The method of claim 18; wherein said step of calibrating for said L2 GPS/GLONASS group delay within said GPS/GLONASS Narrow Band Receiver using said calibration signal $C_{RF\_GPS\_L2}/C_{RF\_GLONASS\_L2}$ further includes the steps of:

(a) tracking and locking on an L2 GPS/GLONASS satellite signal using said GPS/GLONASS Narrow Band Receiver; and (b) generating said calibration signal $C_{RF\_GPS\_L2}/C_{RF\_GLONASS_{13}\_L2}$ using said Calibration Generator circuit.

* * * * *